(12) United States Patent
Hudachek

(10) Patent No.: US 10,427,445 B2
(45) Date of Patent: Oct. 1, 2019

(54) ILLUMINATABLE ASSEMBLY

(71) Applicant: Susan Francesca Hudachek, Timnath, CO (US)

(72) Inventor: Susan Francesca Hudachek, Timnath, CO (US)

( * ) Notice: Subject to any disclaimer, the term of this patent is extended or adjusted under 35 U.S.C. 154(b) by 0 days.

(21) Appl. No.: 16/169,850

(22) Filed: Oct. 24, 2018

(65) Prior Publication Data

US 2019/0054753 A1 Feb. 21, 2019

Related U.S. Application Data

(63) Continuation-in-part of application No. 15/933,605, filed on Mar. 23, 2018, now Pat. No. 10,137,721, which is a continuation-in-part of application No. 14/903,578, filed as application No. PCT/US2014/055323 on Sep. 12, 2014, now Pat. No. 10,137,720.

(60) Provisional application No. 61/876,762, filed on Sep. 12, 2013.

(51) Int. Cl.
| | |
|---|---|
| *B42D 3/12* | (2006.01) |
| *F21V 33/00* | (2006.01) |
| *B42D 1/00* | (2006.01) |
| *F21W 131/30* | (2006.01) |
| *G09B 5/06* | (2006.01) |

(52) U.S. Cl.
CPC ............ *B42D 3/123* (2013.01); *B42D 1/004* (2013.01); *B42D 1/007* (2013.01); *B42D 1/008* (2013.01); *F21V 33/0004* (2013.01); *G09B 5/06* (2013.01); *G09B 5/062* (2013.01); *B42P 2241/16* (2013.01); *F21W 2131/3005* (2013.01)

(58) Field of Classification Search
CPC ...... B42D 3/123; B42D 1/007; B42P 2241/16; F21V 33/0004; F21W 2131/3005
USPC ............................................. 362/98
See application file for complete search history.

(56) References Cited

U.S. PATENT DOCUMENTS

| | | |
|---|---|---|
| 3,622,771 A | 11/1971 | Franc |
| 4,209,824 A | 6/1980 | Kaufman |
| 4,363,081 A | 12/1982 | Wilbur |
| 5,118,138 A | 6/1992 | Brotz |
| 5,167,508 A | 12/1992 | McTaggart |
| 5,301,982 A | 4/1994 | Brotz |
| 5,381,310 A | 1/1995 | Brotz |
| 5,460,414 A | 10/1995 | Sargis |
| 6,951,403 B2 | 10/2005 | Bennett |
| 7,490,948 B2 | 2/2009 | Fisherman et al. |
| 7,656,580 B2 | 2/2010 | Chang |

(Continued)

FOREIGN PATENT DOCUMENTS

| | | |
|---|---|---|
| DE | 10 2010 055551 A1 | 6/2012 |
| EP | 3044012 | 3/2015 |

(Continued)

OTHER PUBLICATIONS

Extended European Search Report for corresponding EPO Patent Application No. 14844578.6; 8 pages total.

(Continued)

*Primary Examiner* — William N Harris
(74) *Attorney, Agent, or Firm* — Susan F. Hudachek

(57) ABSTRACT

An illuminatable assembly, and methods of making and using such an illuminatable assembly, whereby the illuminatable assembly can include at least one page and a support coupled to the page, whereby the support can be configured to support a light-emitting panel provided by a mobile computing device. When in an activated condition, the light-emitting panel can provide light to illuminate at least a portion of the page.

20 Claims, 24 Drawing Sheets

(56) References Cited

U.S. PATENT DOCUMENTS

| | | | | |
|---|---|---|---|---|
| 7,810,266 | B2* | 10/2010 | Arnthorsson | G09F 13/04 |
| | | | | 40/541 |
| 8,087,794 | B2 | 1/2012 | Stravinskas et al. | |
| 2009/0219271 | A1* | 9/2009 | Bandel | G06F 1/1626 |
| | | | | 345/211 |
| 2010/0167258 | A1* | 7/2010 | Ravizza | B42B 5/12 |
| | | | | 434/309 |
| 2016/0059146 | A1 | 3/2016 | Javidan et al. | |
| 2016/0068002 | A1* | 3/2016 | Keller | B42D 3/123 |
| | | | | 386/201 |
| 2016/0159133 | A1 | 6/2016 | Hudachek | |
| 2017/0328555 | A1* | 11/2017 | Alderton | A63H 33/38 |
| 2018/0215186 | A1 | 8/2018 | Hudachek | |

FOREIGN PATENT DOCUMENTS

| | | |
|---|---|---|
| GB | 2 474 583 A | 4/2011 |
| WO | 2015038857 | 3/2015 |

OTHER PUBLICATIONS

International Search Report (ISR) for corresponding PCT International Patent Application No. PCT/US2014/055323; ISR = 2 total pages.
Written Opinion (WO) for corresponding PCT International Patent Application No. PCT/US2014/055323; WO = 6 total pages.
Lite the Nite Books Website, Oct. 6, 2016. Website, http://www.litethenitebooks.com.
Zach Honig, Wired's LED-powered Moto X ad lets you try custom colors before you buy; https://www.engadget.com/2013/12/19/moto-x-wired/; page captured on Feb. 22, 2017.
DK, Good Night, Baby Moon, Book, DK Children, published Sep. 5, 2017. Website, https://www.dk.com/us/9781465463074-good-night-baby-moon/.
U.S. Appl. No. 61/876,762, filed Sep. 12, 2013.

\* cited by examiner

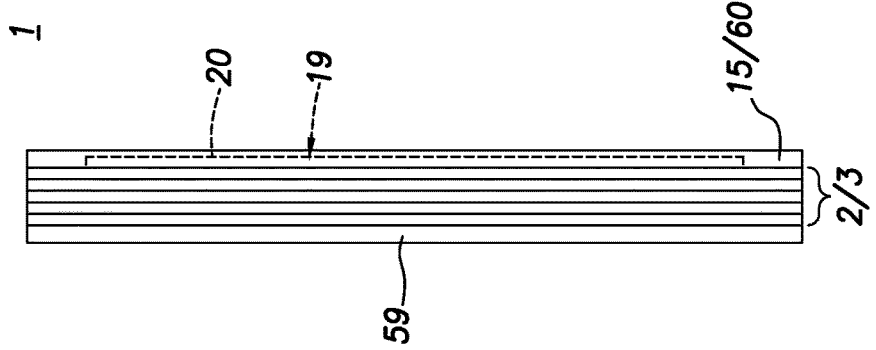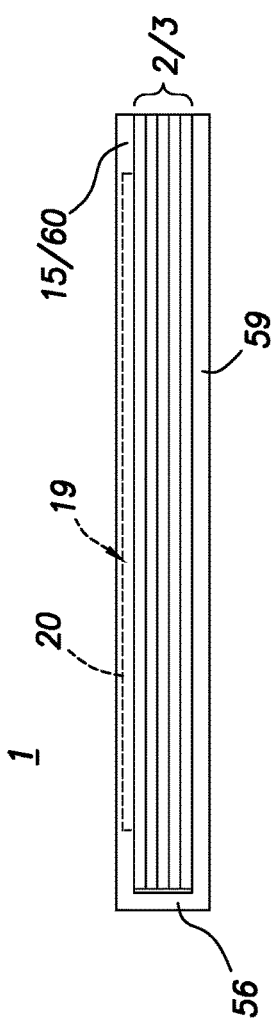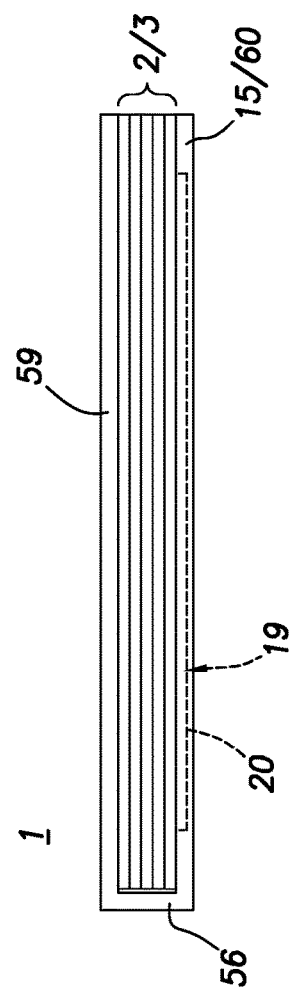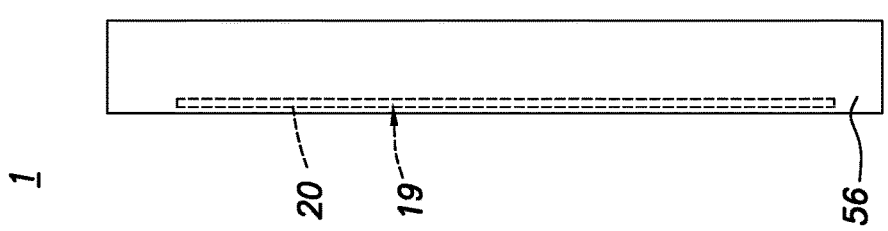

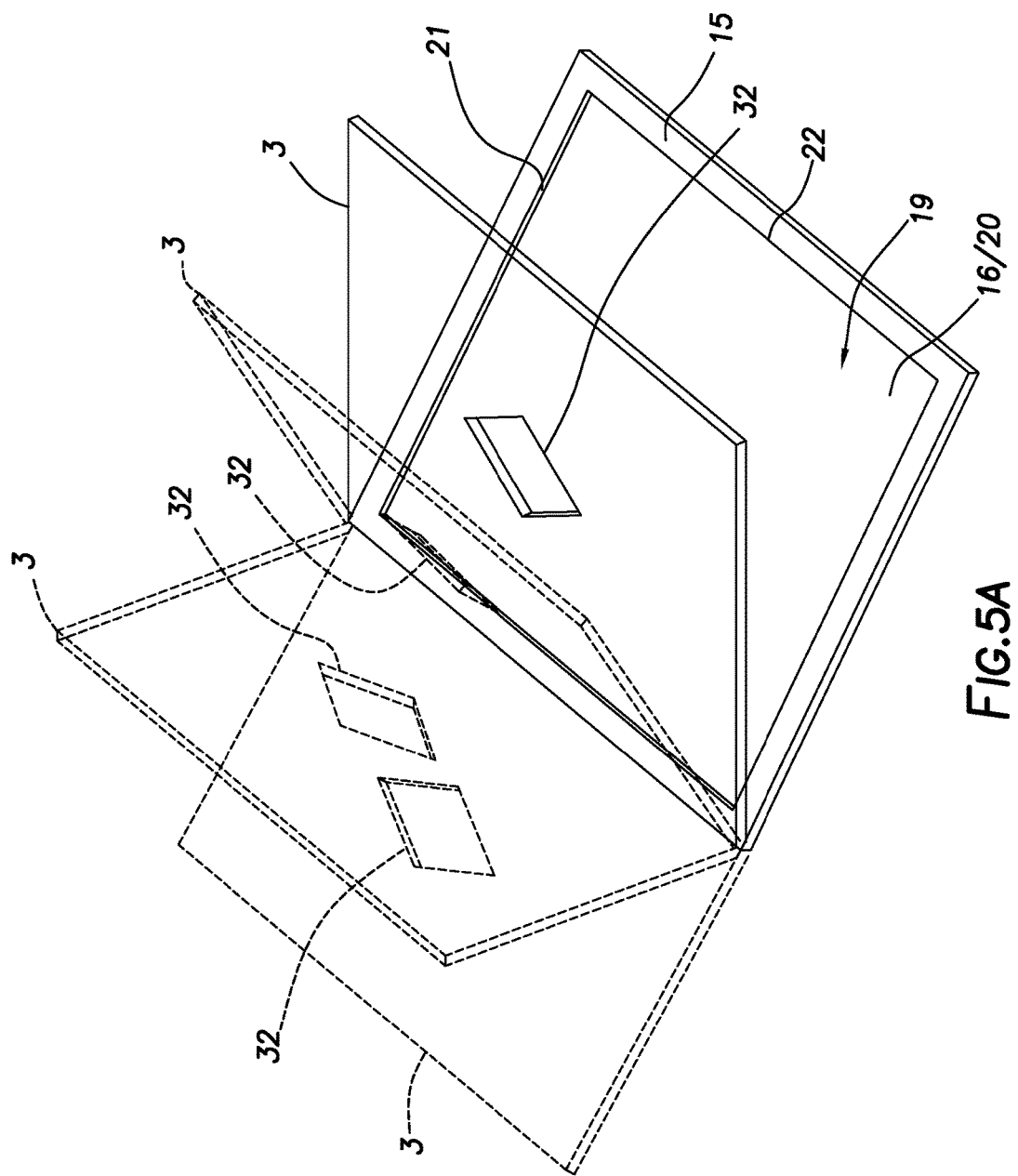

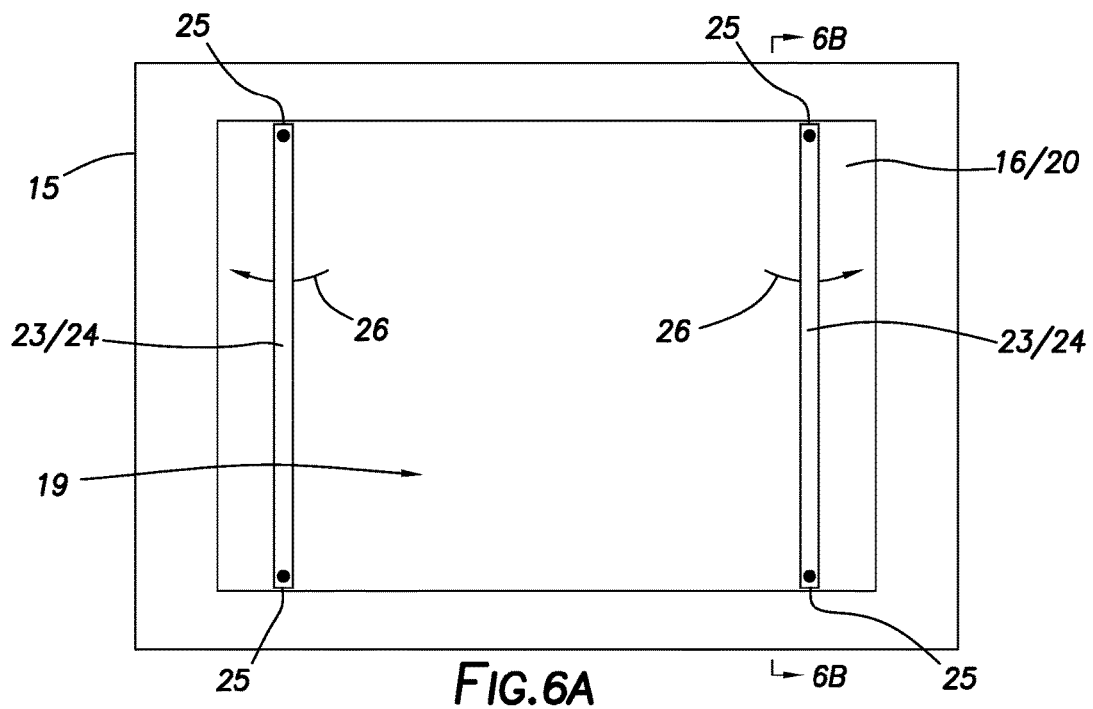
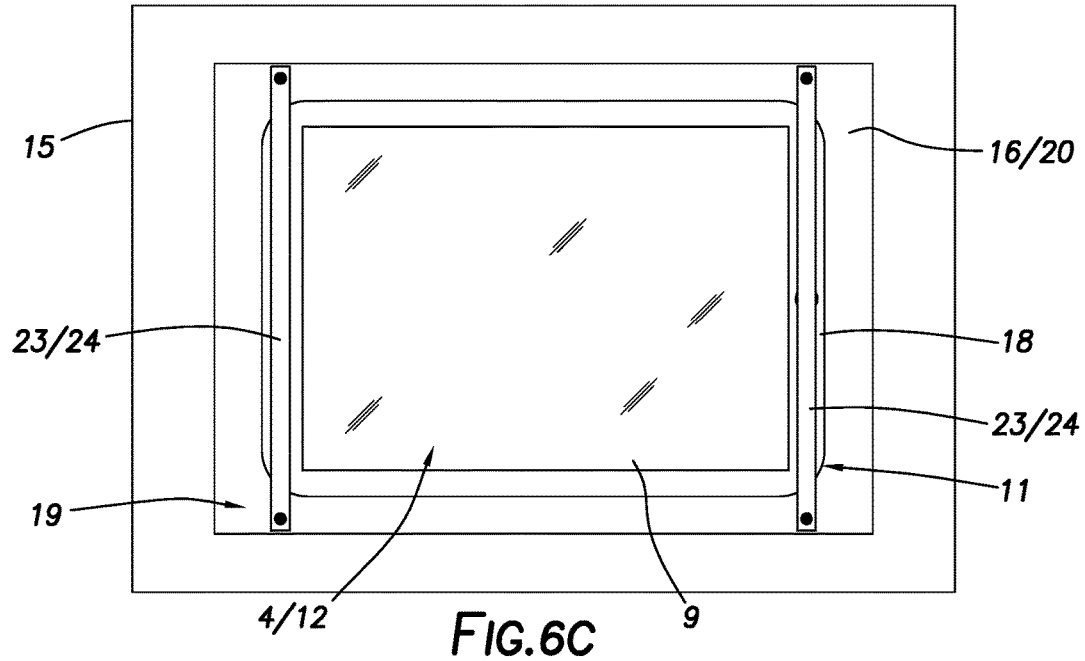

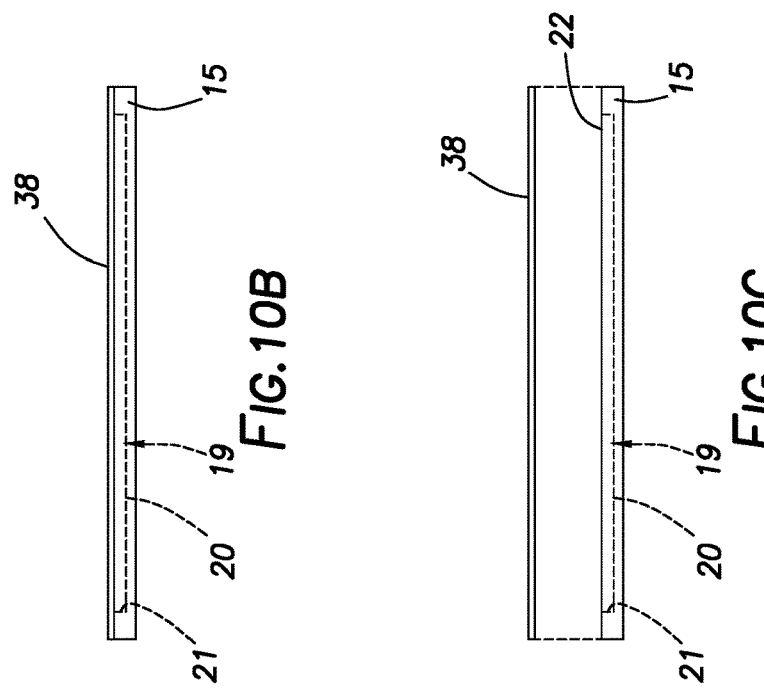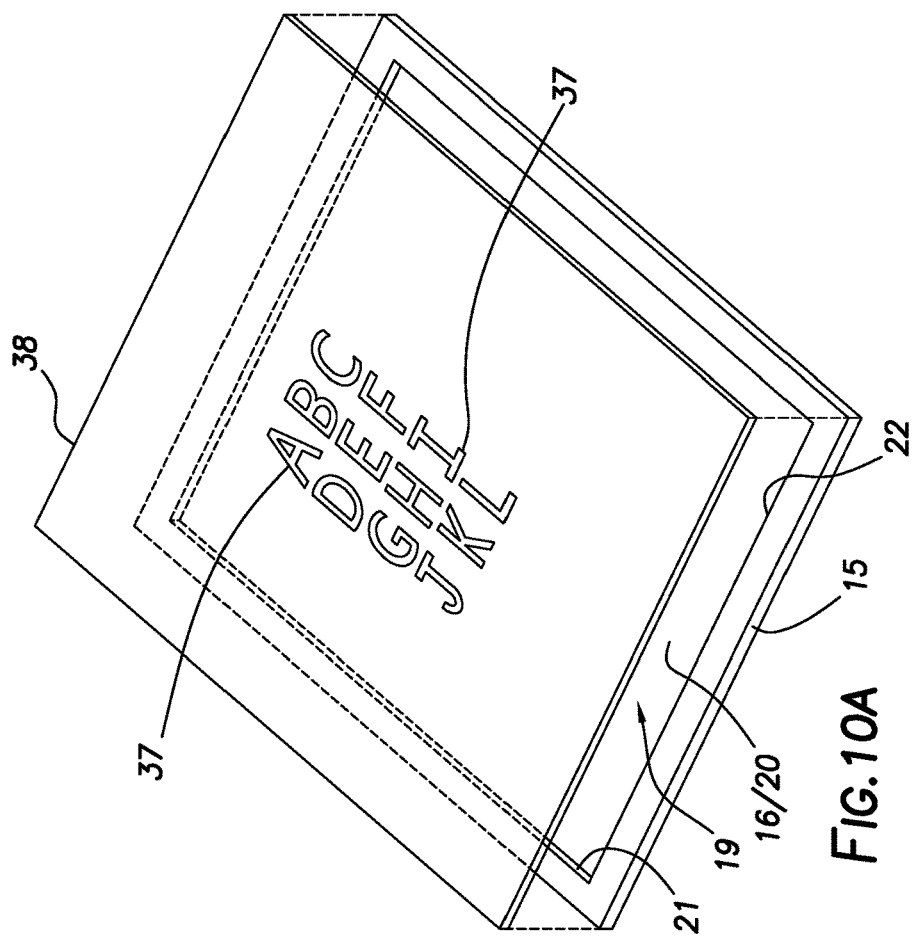

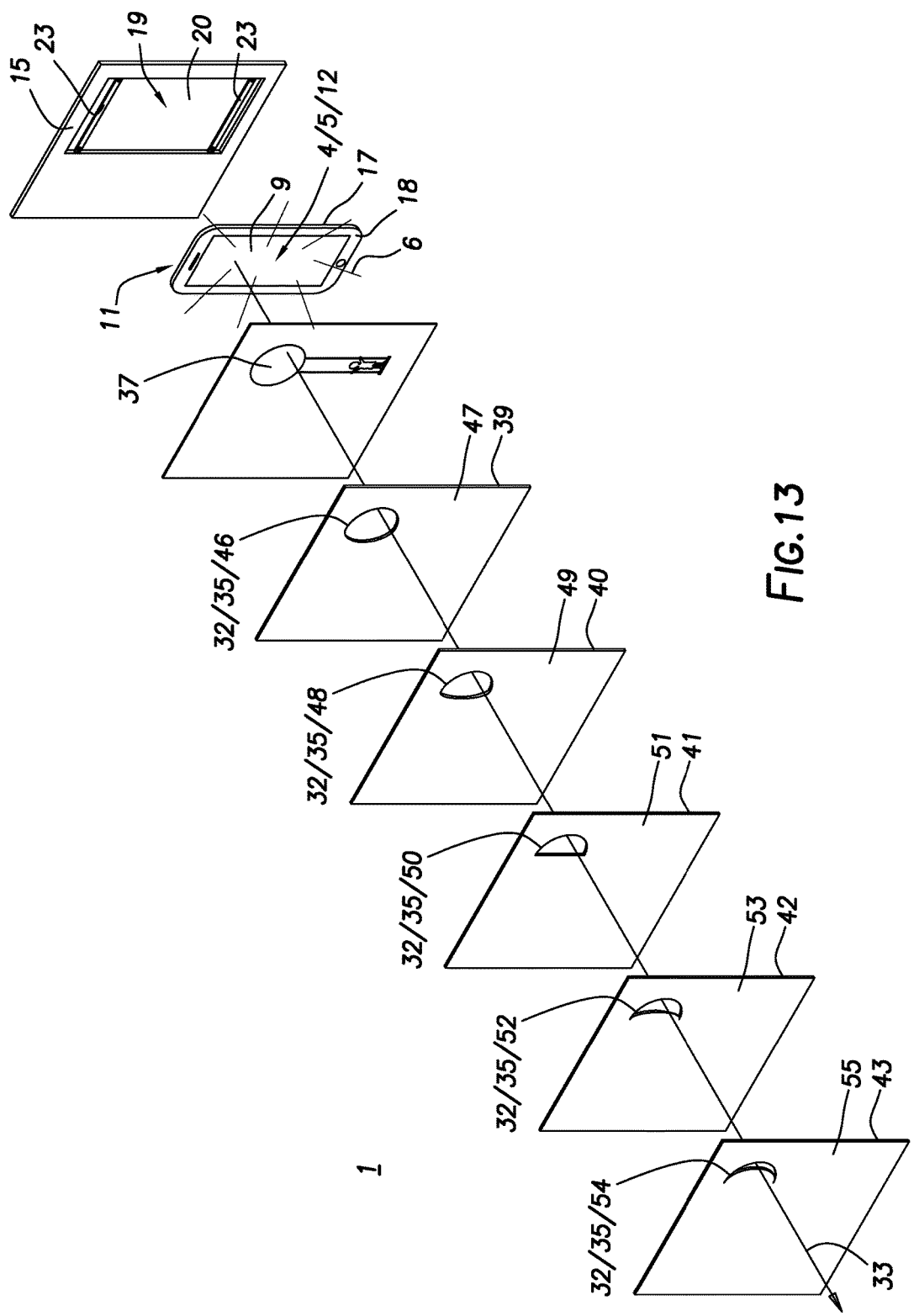

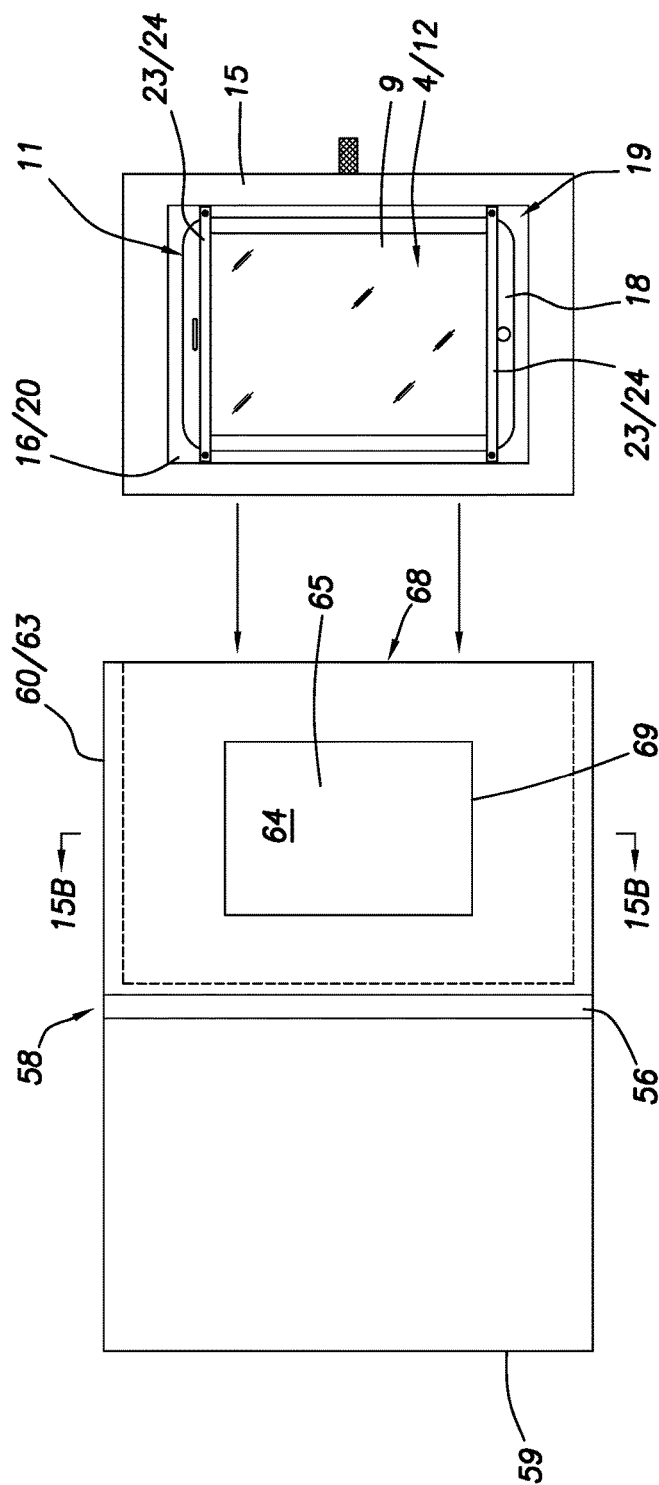
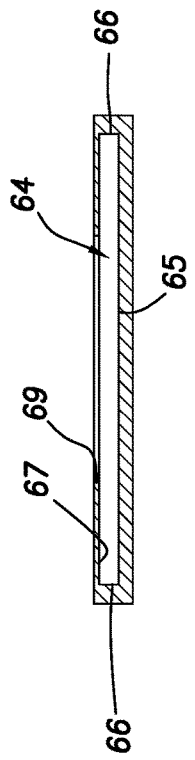
FIG.15A
FIG.15B

ILLUMINATABLE ASSEMBLY

This U.S. Patent Application is a continuation-in-part of U.S. patent application Ser. No. 15/933,605, filed Mar. 23, 2018, which is a continuation-in-part of U.S. patent application Ser. No. 14/903,578, filed Jan. 7, 2016, which is a National Stage Entry of PCT/US2014/055323, filed Sep. 12, 2014, which claims the benefit of U.S. Provisional Patent Application No. 61/876,762, filed Sep. 12, 2013, each hereby incorporated by reference herein.

BRIEF SUMMARY OF THE INVENTION

A broad object of a particular embodiment of the invention can be to provide an illuminatable assembly, and methods of making and using such an illuminatable assembly, whereby the illuminatable assembly can include a support configured to support a light-emitting panel provided by a mobile computing device, and a plurality of sheets movably coupled to the support. Each sheet can include a light transmission portion communicating between sheet front and back surfaces. When the sheets dispose in a first position, the light transmission portions can dispose in overlaying engagement to provide aligned light transmission portions, through which light provided by the light-emitting panel can travel.

Another broad object of a particular embodiment of the invention can be to provide an illuminatable assembly, and methods of making and using such an illuminatable assembly, whereby the illuminatable assembly can include a support configured to support a light-emitting panel provided by a mobile computing device; at least one sheet movably coupled to the support; a light transmission portion disposed within the sheet to communicate between sheet front and back surfaces; and a layer disposed between the support and the sheet, whereby the layer can include at least one illuminatable indicium which can be viewable via the light transmission portion.

Another broad object of a particular embodiment of the invention can be to provide an illuminatable assembly, and methods of making and using such an illuminatable assembly, whereby the illuminatable assembly can include a spine; a support coupled to the spine, whereby the support can be configured to support a light-emitting panel provided by a mobile computing device; at least one sheet movably coupled to the support; and a light transmission portion disposed within the sheet to communicate between sheet front and back surfaces of the sheet. The support can be configured to dispose the light-emitting panel in substantially parallel relation to a longitudinal axis of the spine.

Naturally, further objects of the invention are disclosed throughout other areas of the specification, drawings, and claims.

BRIEF DESCRIPTION OF THE DRAWINGS

FIG. 3D is a top view of the particular embodiment of the illuminatable assembly shown in FIG. 3A.

FIG. 3E is a bottom view of the particular embodiment of the illuminatable assembly shown in FIG. 3A.

FIG. 3F is a first side view of the particular embodiment of the illuminatable assembly shown in FIG. 3A.

FIG. 3G is a second side view of the particular embodiment of the illuminatable assembly shown in FIG. 3A.

FIG. 5A is an isometric view of a particular embodiment of the illuminatable assembly, whereby a sheet can be pivotally coupled or rotatably coupled to a support configured to support a light-emitting panel.

FIG. 6A is a front view of a particular embodiment of a support of the illuminatable assembly.

FIG. 6B is a cross-sectional view of the particular embodiment of the support shown in FIG. 6A.

FIG. 6C is a front view of a particular embodiment of the support shown in FIG. 6A, whereby the support is shown supporting a relatively smaller light-emitting panel.

FIG. 10A is an isometric view of a particular embodiment of a support and a layer of the illuminatable assembly.

FIG. 10B can be a top, bottom, first side, or second side view of a particular embodiment of a support and a layer of the illuminatable assembly.

FIG. 10C can be a top, bottom, first side, or second side view of a particular embodiment of a support and a layer of the illuminatable assembly.

FIG. 13 is an isometric view of a particular embodiment of the illuminated assembly.

FIG. 15A is a front view of a particular embodiment of a cover of the illuminatable assembly, whereby a back cover element can be configured as a housing which can house a support and correspondingly, a light-emitting panel, within its interior space.

FIG. 15B is a cross-sectional view of the particular embodiment of the cover shown in FIG. 15A.

DETAILED DESCRIPTION OF THE INVENTION

Figure 1:
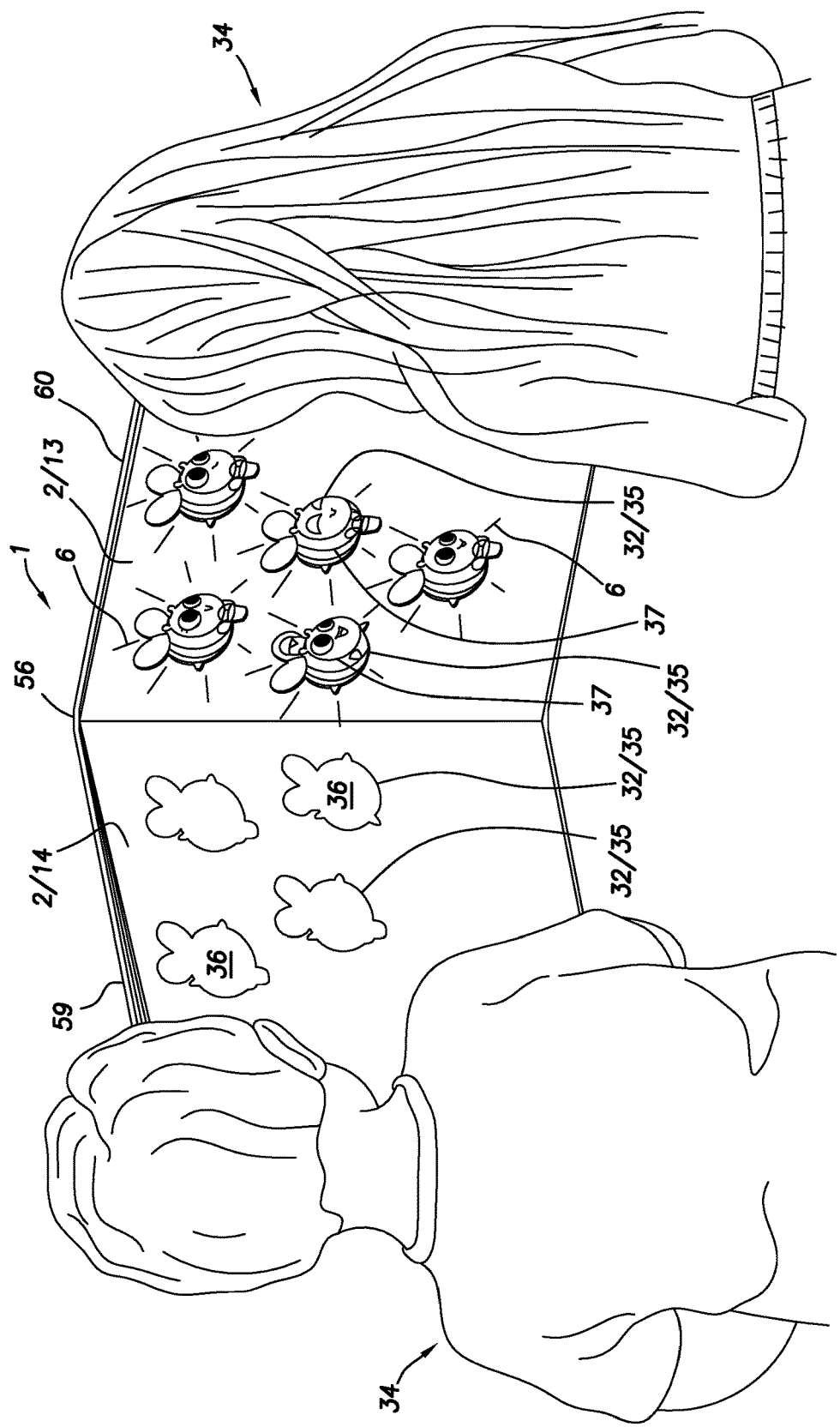
FIG. 1 is an illustration of a method of using a particular embodiment of the illuminatable assembly.
Figure 2:
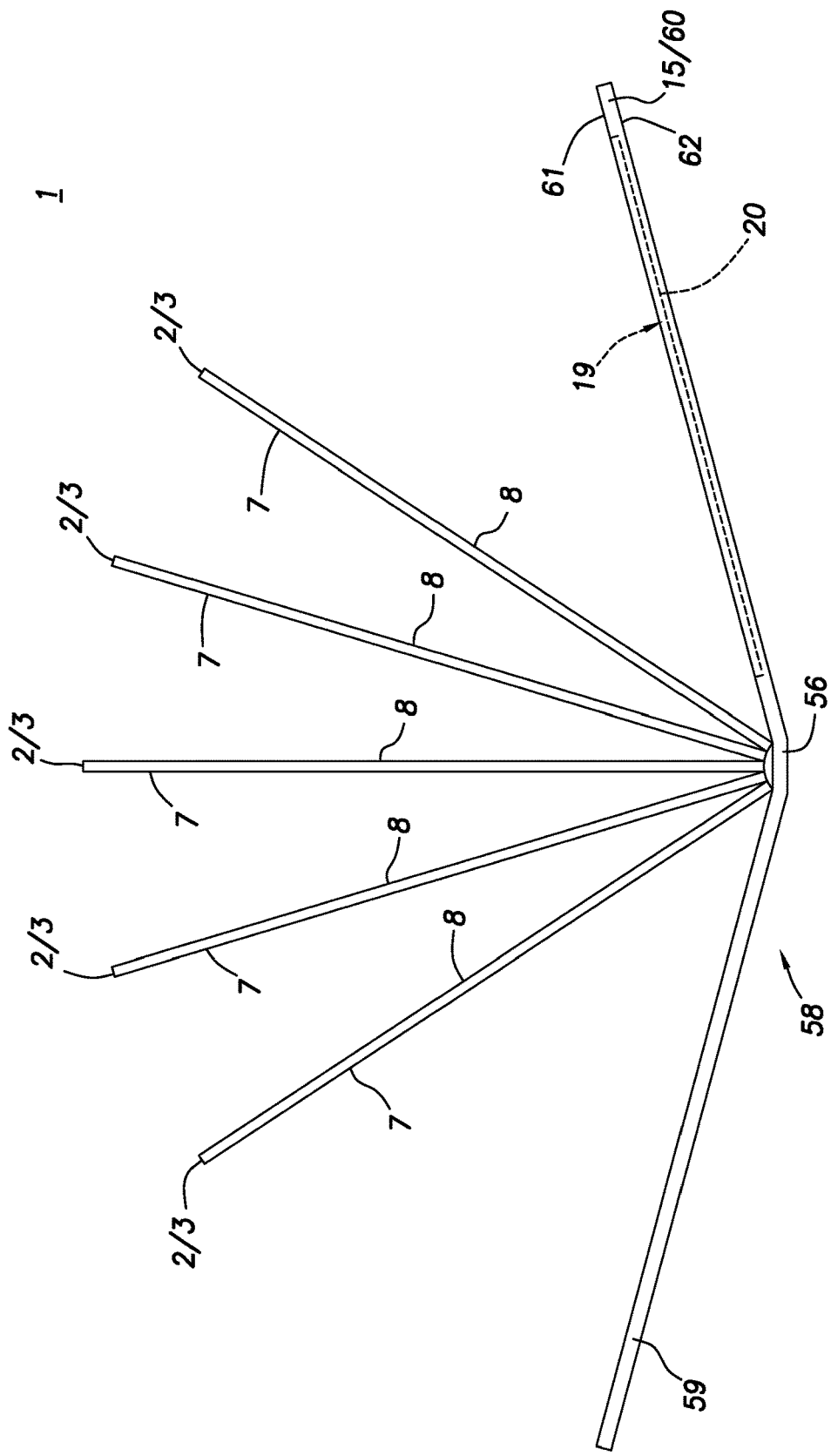
FIG. 2 is a bottom view of a particular embodiment of the illuminatable assembly.
Figure 3A:
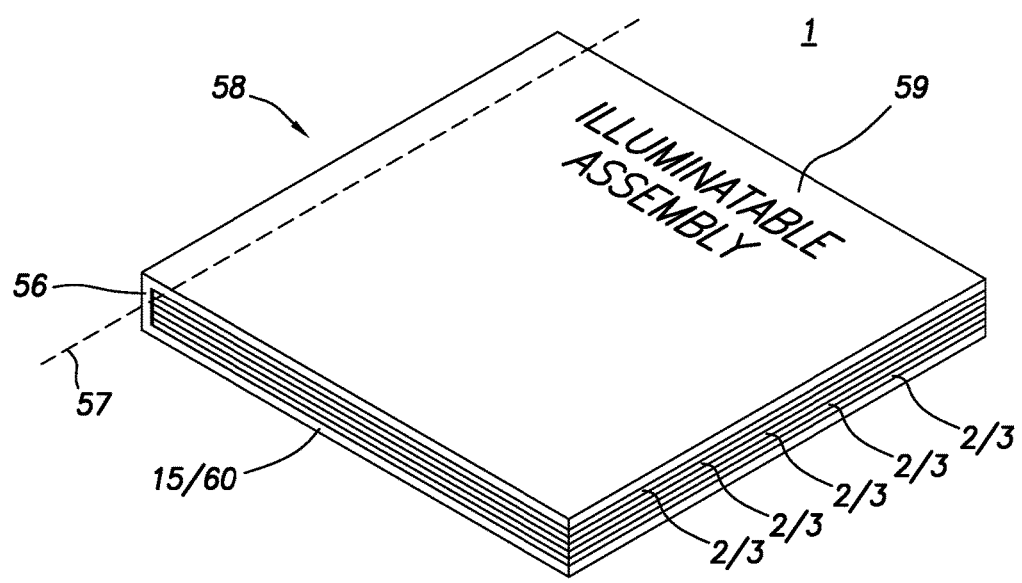
FIG. 3A is a front isometric view of a particular embodiment of the illuminatable assembly.
Figures 3B, 3C:
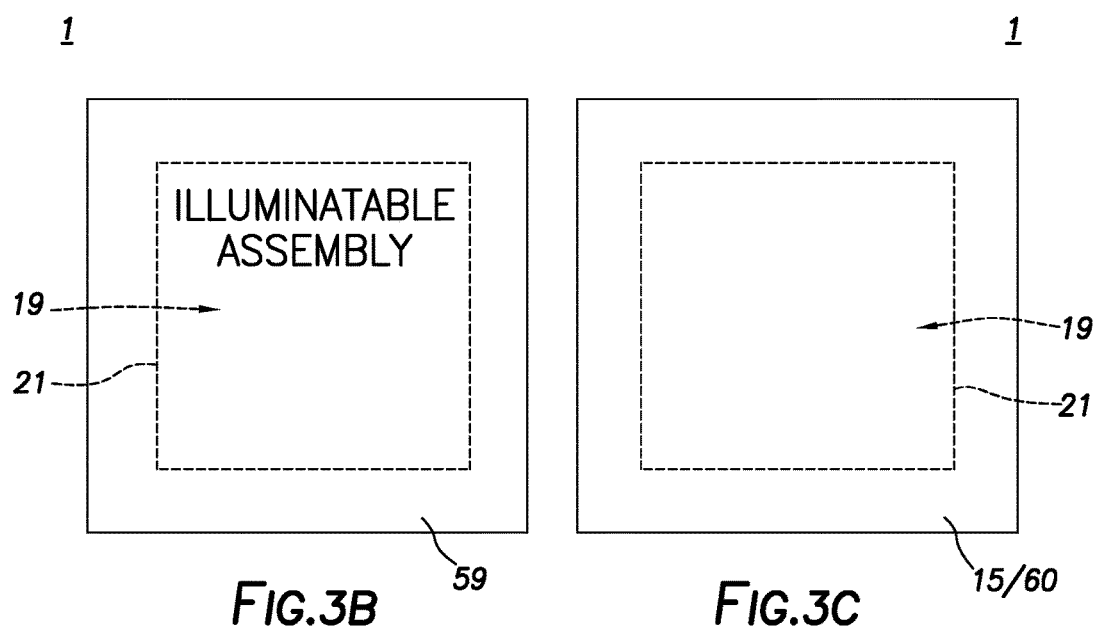
FIG. 3B is a front view of the particular embodiment of the illuminatable assembly shown in FIG. 3A.
FIG. 3C is a rear view of the particular embodiment of the illuminatable assembly shown in FIG. 3A.
Figure 4A:
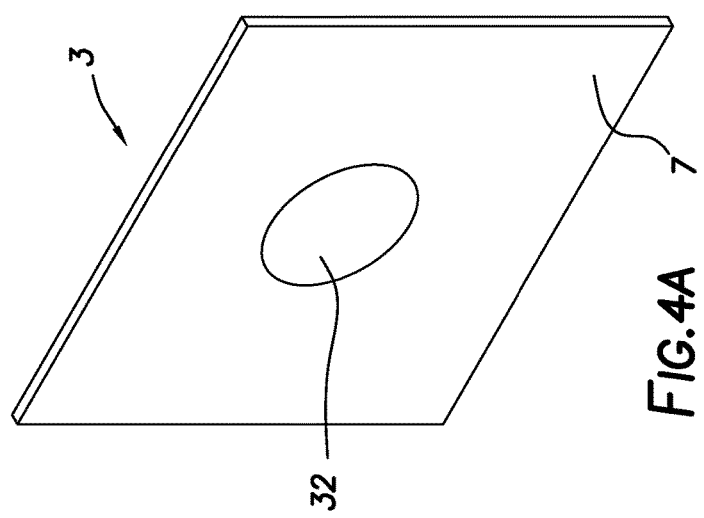
FIG. 4A is a front isometric view of a particular embodiment of a sheet of the illuminatable assembly.
Figure 4B:
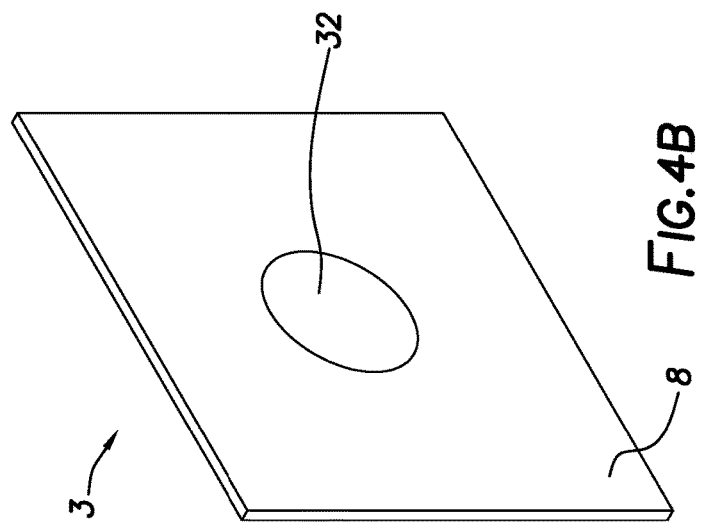
FIG. 4B is a rear isometric view of the particular embodiment of the sheet shown in FIG. 4A.
Figure 4C:
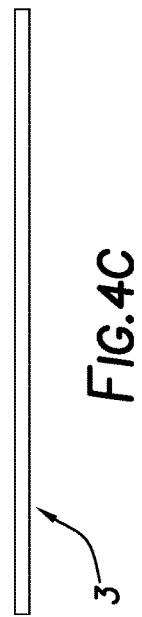
FIG. 4C can be a top, bottom, first side, or second side view of the particular embodiment of the sheet shown in FIG. 4A.

Now referring primarily to FIG. 1, which illustrates a method of using a particular embodiment of the inventive illuminatable assembly (1) including (i) at least one page (2) provided by a sheet (3) and (ii) a light-emitting panel (4) coupled to the page (2), whereby the light-emitting panel (4) in an activated condition (5) can provide light (6) to illuminate at least a portion of the page (2). The method of use can include activating the light-emitting panel (4) to the activated condition (5) and viewing the page (2) having at least a portion of the page (2) illuminated by the light-emitting panel (4).

The term "sheet" as used herein can mean something that may be relatively thin in comparison to its length and width. As to particular embodiments, a sheet (3) may be a square or rectangular piece of paper or paper product, especially one which may be printed or written upon; however, a sheet (3) as used herein is not limited to a square or rectangular perimeter, nor is a sheet (3) as used herein limited to being made from paper or a paper product.

The sheet (3) can include a sheet front surface (7) opposite a sheet back surface (8), whereby the sheet (3) can be capable of overlaying engagement with the light-emitting panel (4). As to particular embodiments, the sheet back surface (8) can be capable of overlaying engagement with a light-emitting panel front surface (9) of the light-emitting panel (4).

The term "overlay" as used herein can mean to extend over so as to cover at least partially, to place or be placed so that at least a part of one covers at least a part of another, to lie over, or to overlap.

The term "overlaying engagement" as used herein can refer to partial overlaying engagement, being partially overlayingly engaged, entire overlaying engagement, or being entirely overlayingly engaged, depending upon the embodiment.

The term "overlaying engagement" as used herein should be broadly construed as meaning that there may or may not be something disposed between the elements which are overlayingly engaged, depending upon the embodiment. For example, when the sheet (3) disposes in overlaying engagement with the light-emitting panel (4), there may or may not be something disposed between the sheet (3) and the light-emitting panel (4) or between the sheet back surface (8) and the light-emitting panel front surface (9), depending upon the embodiment.

Light-Emitting Panel

Figure 11:
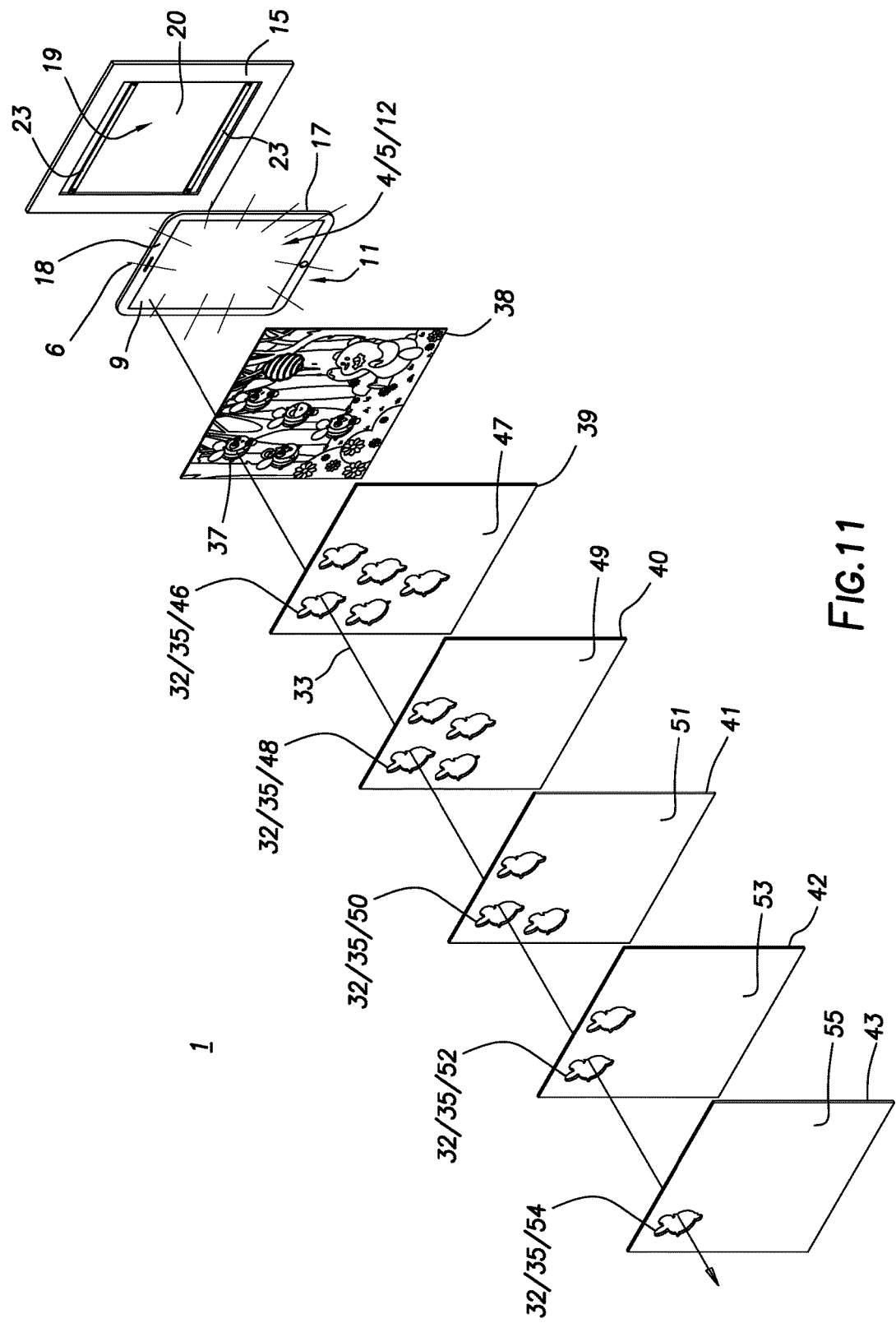
FIG. 11 is an isometric view of a particular embodiment of the illuminatable assembly.
Figure 15C:
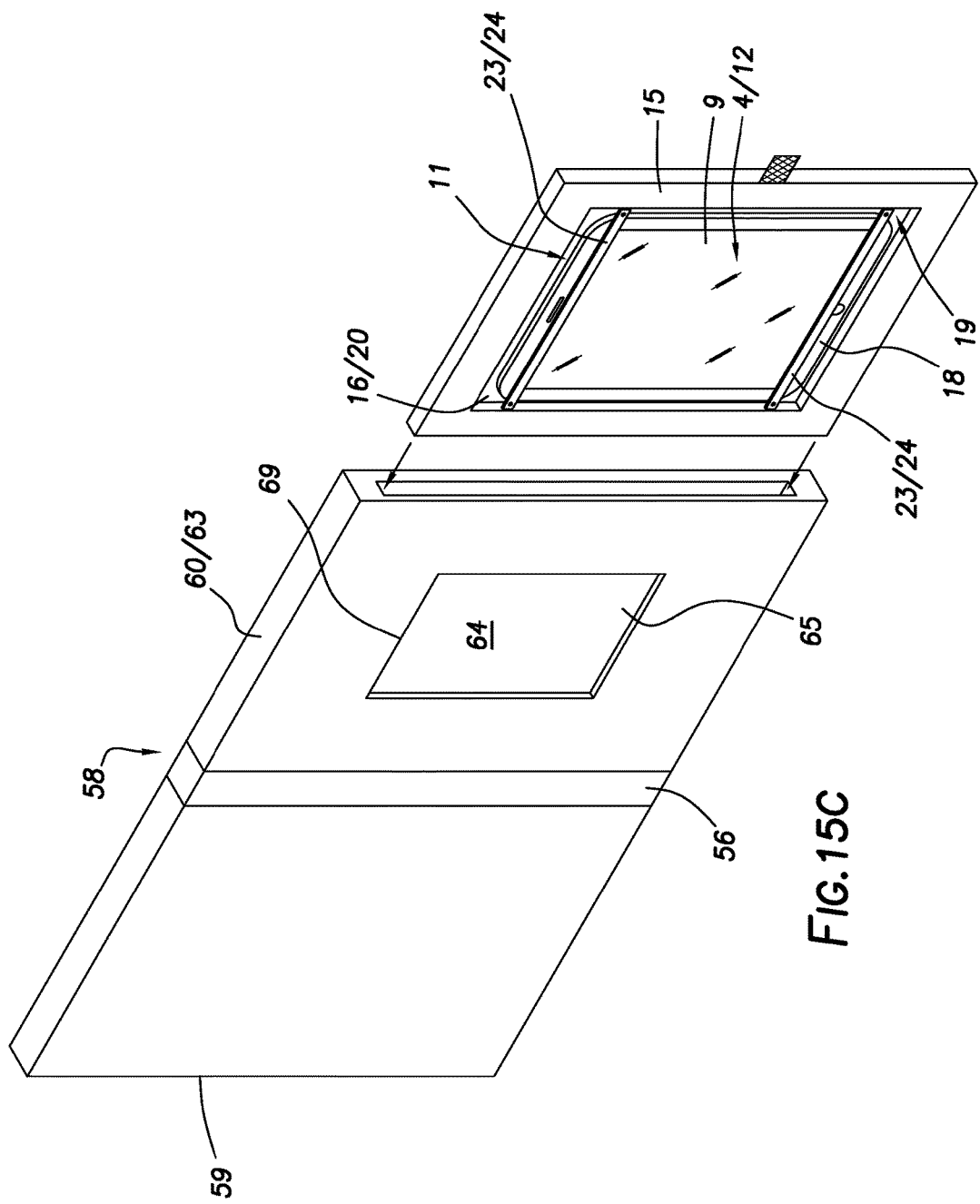
FIG. 15C is an isometric view of the particular embodiment of the cover and support shown in FIG. 15A.

Now referring primarily to FIG. 11, FIG. 13, and FIG. 15, the illuminatable assembly (1) can accommodate, incorporate, or include a light-emitting panel (4) having a light-emitting panel front surface (9) opposite a light-emitting panel back surface (not shown), whereby the light-emitting panel front surface (9) can be the surface of the light-emitting panel (4) (i) which emits light (6) or (ii) from which light (6) can be emitted. The light-emitting panel (4) can be coupled to at least one sheet (3), whereby the light-emitting panel (4) in an activated condition (5) can provide light (6) to illuminate at least a portion of the sheet (3).

As to particular embodiments, the light-emitting panel (4) can be provided by a mobile computing device (11), which can mean that the mobile computing device (11) comprises or includes a light-emitting panel (4).

As to particular embodiments, the mobile computing device (11) can be configured as a mobile phone.

As to particular embodiments, the mobile computing device (11) can be configured as a smartphone.

As to particular embodiments, the mobile computing device (11) can be configured as a tablet computer.

As to particular embodiments, the light-emitting panel (4) can be provided by a display (12) of the mobile computing device (11).

As to particular embodiments, the display (12) can be receptive to touch input.

As to particular embodiments, the display (12) can be configured to provide (i) a substantially monochromatic screen or (ii) a monochromic screen which can function to illuminate at least a portion of the sheet (3). As but one illustrative example, the display (12) can be configured to provide a white screen which can function to illuminate at least a portion of the sheet (3).

As to particular embodiments, a majority of the display (12) can display a monochromatic screen, such as a white screen. As to other particular embodiments, an entirety of the display (12) can display a monochromatic screen, such as a white screen.

It is herein contemplated that the mobile computing device (11) can have a numerous and wide variety of configurations, each including at least a display (12), a processor, and a memory element. As would be known to one of ordinary skill in the art, the display (12) can be controlled to at least emit light (6), and if desired, the display (12) can typically also be controlled to display media content, such as a static image, or video.

As to particular embodiments, the mobile computing device (11) can further include one or more interfaces that enable wired and/or wireless communication of data over a network, as would be known to one of ordinary skill in the art.

For the purpose of providing further, non-limiting details, as would be known to one of ordinary skill in the art, the mobile computing device (11) can include one or more processors (e.g., any of microprocessors, controllers, or the like), which can process various computer-executable instructions to control the operation of the mobile computing device (11) and enable cooperation between the mobile computing device (11) and the illuminatable assembly (1), for example to enable the light-emitting panel (4) of the mobile computing device (11) to provide light (6) to illuminate at least a portion of a page (2) of the illuminatable assembly (1). Alternatively or in addition, the mobile computing device (11) can be implemented with any one or combination of hardware, firmware, or fixed logic circuitry that can be employed in connection with processing and control circuits. Further, the mobile computing device (11) can include a system bus or data transfer system that couples the various components within the mobile computing device (11), whereby a system bus can include any one or combination of different bus structures, such as a memory bus or memory controller, a peripheral bus, a universal serial bus, and/or a processor or local bus that utilizes any of a variety of bus architectures.

The mobile computing device (11) can also include computer-readable media, such as one or more memory devices that enable persistent and/or non-transitory data storage (i.e., in contrast to mere signal transmission), examples of which include random access memory (RAM), or non-volatile memory (e.g., any one or more of a read-only memory (ROM), flash memory, EPROM, EEPROM, etc.).

Computer-readable media can provide data storage mechanisms to store data, as well as various programs or applications and any other types of information and/or data related to operational aspects of the mobile computing device (11). For example, an operating system can be maintained as a program or application with computer-readable media which may be executed by one or more processors.

Programs or applications can include a device manager, such as any form of a control application, software application, signal-processing and control module, code that is native to a particular mobile computing device (11), a hardware abstraction layer for a particular mobile computing device (11), and so on. As to particular embodiments, programs or applications can also include any system components, engines, or managers to implement the illuminatable assembly (1) and/or the mobile computing device (11). For example, the program or application can include the controller detailed below.

Sheet

Now referring primarily to FIG. 2 through FIG. 5C, and FIG. 11 through FIG. 14L, the illuminatable assembly (1) can further include at least one sheet (3) to which the light-emitting panel (4) can couple, whereby the sheet (3)

can include a sheet front surface (7) opposite a sheet back surface (8). As stated above, the sheet (3) can be capable of overlaying engagement with the light-emitting panel (4). As to particular embodiments, the sheet back surface (8) can be capable of overlaying engagement with the light-emitting panel front surface (9). In this way, the sheet (3) can be illuminated from behind by the light-emitting panel (4).

As to particular embodiments, the sheet (3) can be movably coupled to the light-emitting panel (4), meaning that the sheet (3) can move in relation to the light-emitting panel (4). Following, upon (i) disposition in or (ii) moving toward or to a first position (13), the sheet (3) can be in overlaying engagement with the light-emitting panel (4), and/or the sheet back surface (8) can be in overlaying engagement with the light-emitting panel front surface (9). Conversely, upon (i) disposition in or (ii) moving toward or to a second position (14), the sheet (3) can be in non-overlaying engagement with the light-emitting panel (4) or disposed away from the light-emitting panel (4), and/or the sheet back surface (8) can be in non-overlaying engagement with the light-emitting panel front surface (9) or disposed away from the light-emitting panel front surface (9).

Figure 5B:
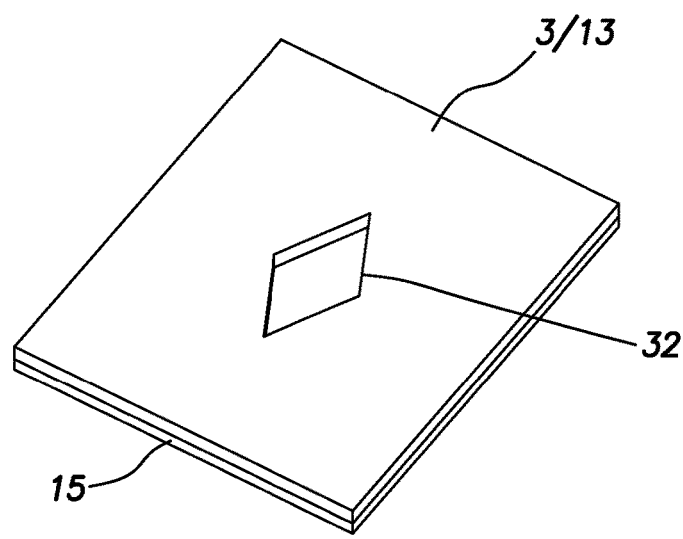
FIG. 5B is an isometric view of the particular embodiment of the illuminatable assembly shown in FIG. 5A, whereby the sheet disposes in a first position and/or overlayingly engages the support.
Figure 5C:
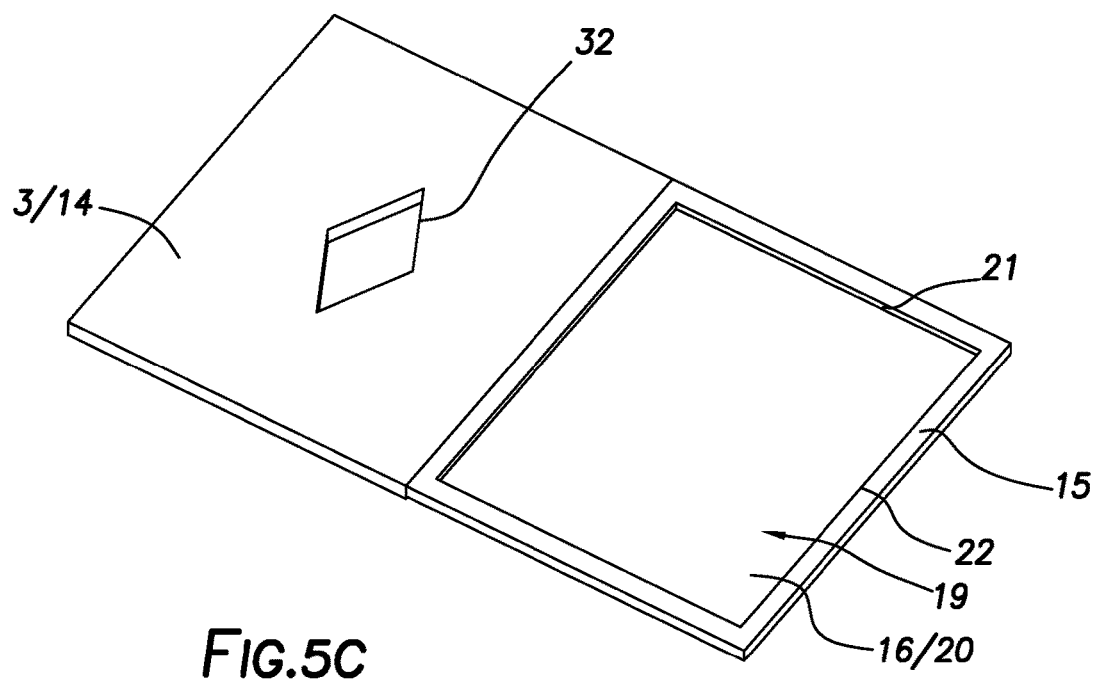
FIG. 5C is an isometric view of the particular embodiment of the illuminatable assembly shown in FIG. 5A, whereby the sheet disposes in a second position and/or disposes away from the support.
Figure 6D:
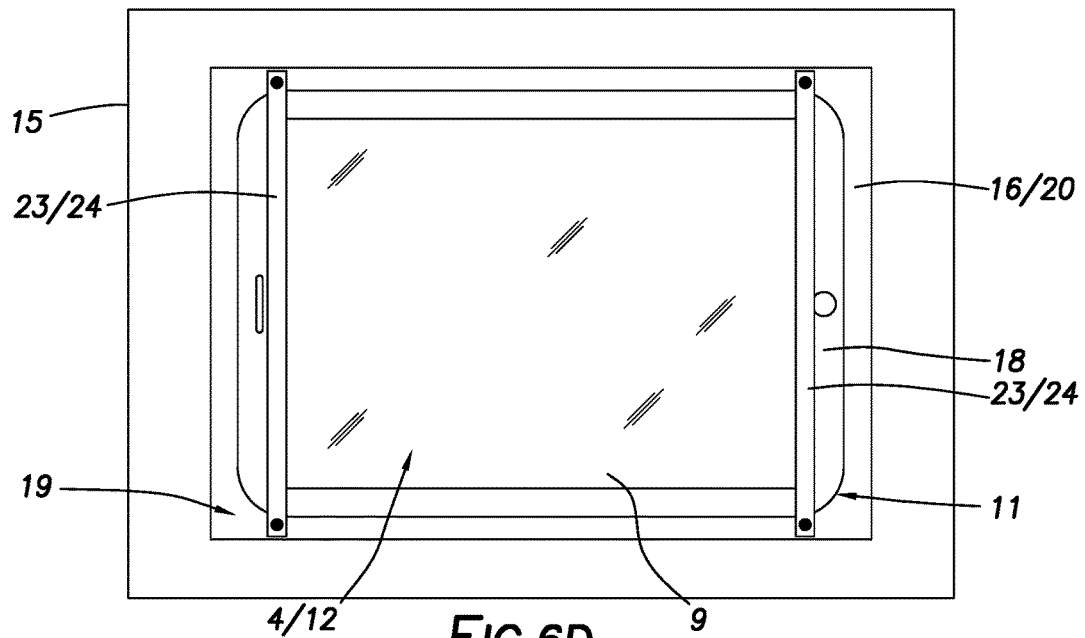
FIG. 6D is a front view of a particular embodiment of the support shown in FIG. 6A, whereby the support is shown supporting a relatively larger light-emitting panel.
Figure 7A:
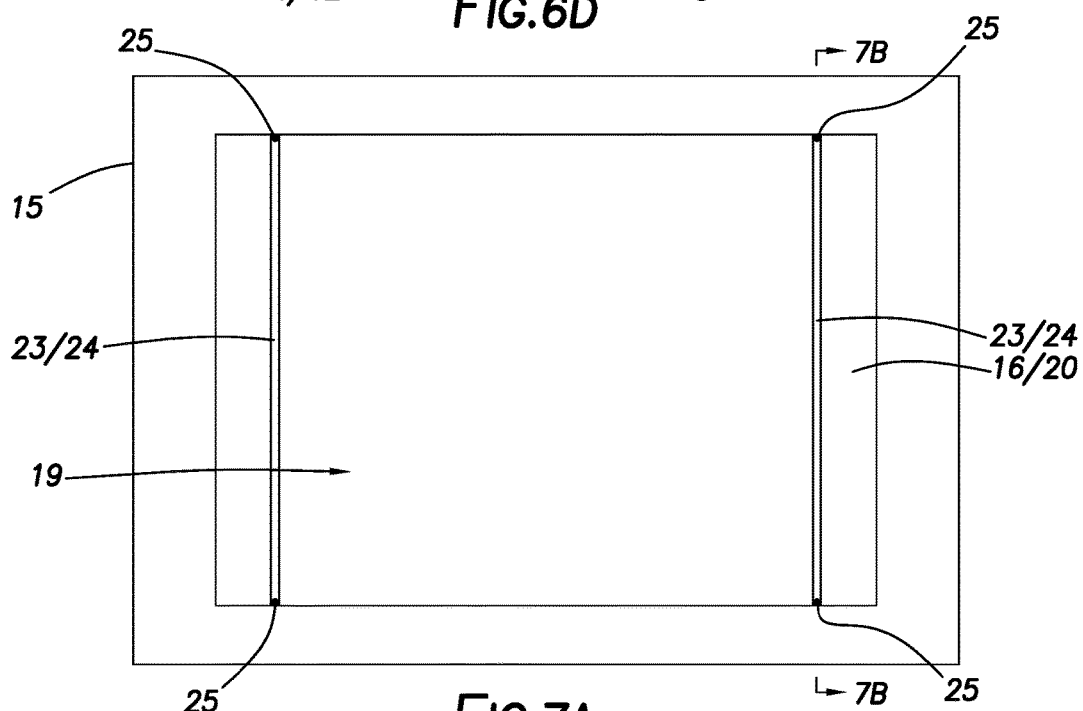
FIG. 7A is a front view of a particular embodiment of a support of the illuminatable assembly.
Figure 7B:
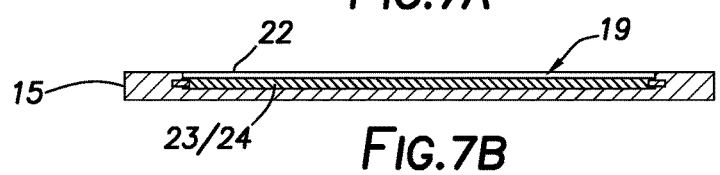
FIG. 7B is a cross-sectional view of the particular embodiment of the support shown in FIG. 7A.
Figure 7C:
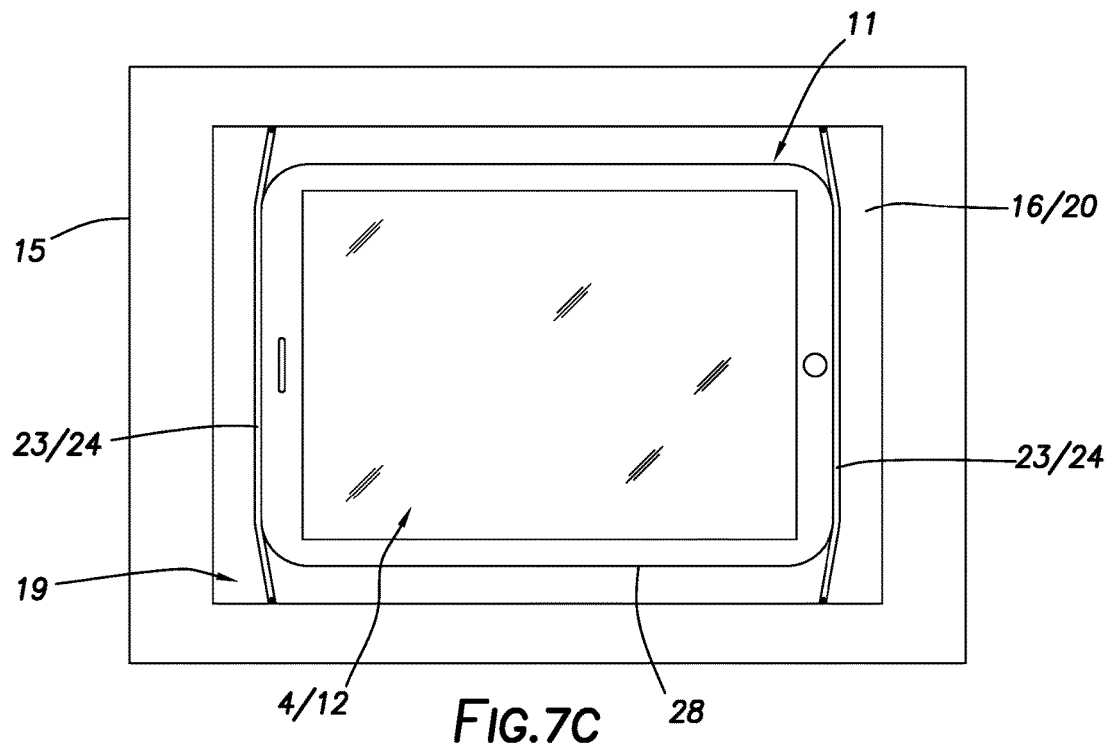
FIG. 7C is a front view of a particular embodiment of the support shown in FIG. 7A, whereby the support is shown supporting a relatively smaller light-emitting panel.
Figure 7D:
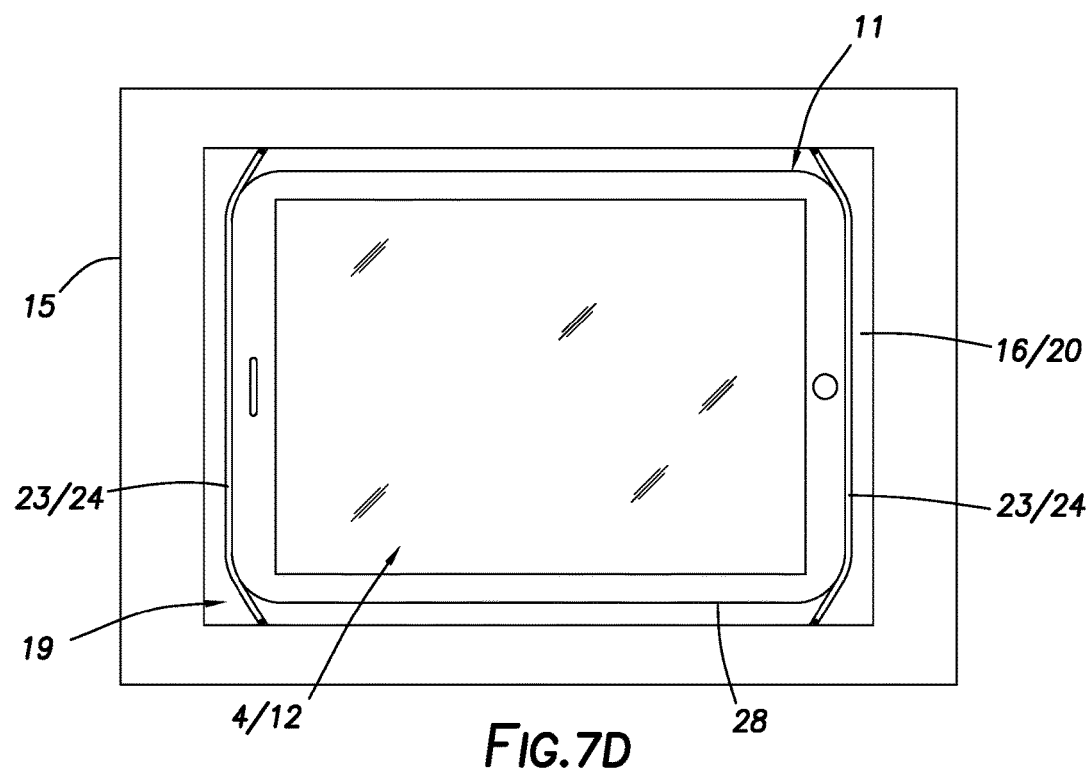
FIG. 7D is a front view of a particular embodiment of the support shown in FIG. 7A, whereby the support is shown supporting a relatively larger light-emitting panel.

Now referring primarily to FIG. 5A through FIG. 5C, as to particular embodiments, the sheet (3) can be pivotally coupled to the light-emitting panel (4), meaning that the sheet (3) can pivot in relation to the light-emitting panel (4). Following, upon (i) disposition in or (ii) pivoting toward or to a first position (13), the sheet (3) can be in overlaying engagement with the light-emitting panel (4), and/or the sheet back surface (8) can be in overlaying engagement with the light-emitting panel front surface (9). Conversely, upon (i) disposition in or (ii) pivoting toward or to a second position (14), the sheet (3) can be in non-overlaying engagement with the light-emitting panel (4) or disposed away from the light-emitting panel (4), and/or the sheet back surface (8) can be in non-overlaying engagement with the light-emitting panel front surface (9) or disposed away from the light-emitting panel front surface (9).

Again referring primarily to FIG. 5A through FIG. 5C, as to particular embodiments, the sheet (3) can be rotatably coupled to the light-emitting panel (4), meaning that the sheet (3) can rotate in relation to the light-emitting panel (4). Following, upon (i) disposition in or (ii) rotating toward or to a first position (13), the sheet (3) can be in overlaying engagement with the light-emitting panel (4), and/or the sheet back surface (8) can be in overlaying engagement with the light-emitting panel front surface (9). Conversely, upon (i) disposition in or (ii) rotating toward or to a second position (14), the sheet (3) can be in non-overlaying engagement with the light-emitting panel (4) or disposed away from the light-emitting panel (4), and/or the sheet back surface (8) can be in non-overlaying engagement with the light-emitting panel front surface (9) or disposed away from the light-emitting panel front surface (9).

As to particular embodiments, the sheet (3) can be slidably coupled to the light-emitting panel (4), meaning that the sheet (3) can slide in relation to the light-emitting panel (4) (not shown). Following, upon (i) disposition in or (ii) sliding toward or to a first position (13), the sheet (3) can be in overlaying engagement with the light-emitting panel (4), and/or the sheet back surface (8) can be in overlaying engagement with the light-emitting panel front surface (9). Conversely, upon (i) disposition in or (ii) sliding toward or to a second position (14), the sheet (3) can be in non-overlaying engagement with the light-emitting panel (4) or disposed away from the light-emitting panel (4), and/or the sheet back surface (8) can be in non-overlaying engagement with the light-emitting panel front surface (9) or disposed away from the light-emitting panel front surface (9).

The sheet (3) can be movably coupled, pivotally coupled, rotatably coupled, or slidably coupled to the light-emitting panel (4) using any of a numerous and wide variety of conventional or non-conventional coupling elements, such as adhesives, mechanical fasteners, or any coupling element or method of coupling which can movably couple, pivotally couple, rotatably couple, or slidably couple the sheet (3) to the light-emitting panel (4).

As to particular embodiments, the sheet (3) can be movably coupled, pivotally coupled, or rotatably coupled to the light-emitting panel (4) in the same fashion as or in a fashion similar to (i) the way pages of a conventional book are coupled or bound to one another, or (ii) the way a page of a conventional book is coupled or bound to a cover of the book.

The sheet (3) can be formed from any of a numerous and wide variety of materials, depending upon the embodiment. As illustrative examples, the sheet (3) can be formed from paper, a paper product, a paper-like material, plastic, fabric, metal, or the like, or combinations thereof; however, the invention need not be so limited, as the sheet (3) can be formed from any material which can couple to the light-emitting panel (4) and provide a page (2) of the illuminatable assembly (1).

Support

As shown in the Figures, the light-emitting panel (4) can be coupled to the sheet (3) via a support (15) configured to support or mount the light-emitting panel (4) and/or the associated mobile computing device (11) such that the light-emitting panel (4) can be overlaid by the sheet (3). Specifically, the support (15) can support the light-emitting panel (4) and/or the associated mobile computing device (11) such that the light-emitting panel front surface (9) can be overlaid by the sheet back surface (8).

The term "support" or the act of "supporting" as used herein can mean one or more of the following: to hold up or serve as a foundation or prop for, to hold or maintain in a desired position and/or location, or to hold something relatively firmly.

The support (15) can have any of a numerous and wide variety of configurations, all of which can be able to releasably (or removably) engage with the light-emitting panel (4) and/or the associated mobile computing device (11) to support the light-emitting panel (4) and/or the associated mobile computing device (11), thereby effectively releasably (or removably) coupling the light-emitting panel (4) to the sheet (3) and correspondingly, to a page (2) of the illuminatable assembly (1).

As to particular embodiments, the support (15) can include a support surface (16) which can be configured to (i) dispose proximate, (ii) couple to, or (iii) engage with the light-emitting panel (4) and/or the associated mobile computing device (11) to dispose the light-emitting panel back surface and/or the associated mobile computing device back surface (17) (i) in substantially parallel relation or (ii) in parallel relation to the support surface (16). Accordingly, this can also dispose the light-emitting panel front surface (9) and/or the associated mobile computing device front surface (18) (i) in substantially parallel relation or (ii) in parallel relation to the support surface (16).

As to particular embodiments, the support (15) can include a cavity (19) configured to receive the light-emitting panel (4) and/or the associated mobile computing device (11), whereby the cavity (19) can be defined by a bottom wall (20) which may be provided by the support surface (16). The cavity (19) can be further defined by one or more side walls (21) upwardly extending from the bottom wall (20). An open end (22) can dispose opposite the bottom wall (20), whereby the light-emitting panel (4) and/or the associated mobile computing device (11) can be passed through the open end (22) for receipt within the cavity (19). Upon receipt, the light-emitting panel back surface and/or the associated mobile computing device back surface (17) can dispose proximate the bottom wall (20).

As to particular embodiments, the cavity (19) can be configured as a rectangle, having (i) two opposing longer side walls and (ii) two opposing shorter side walls, whereby this configuration may be useful for accommodating a generally rectangular light-emitting panel (4) and/or associated mobile computing device (11). Of course, it is herein contemplated that the cavity (19) can be configured to accommodate not only the light-emitting panel (4) and/or the associated mobile computing device (11) but also a case, cover, skin, or the like which may be associated with the mobile computing device (11).

As to particular embodiments, the support (15) can be configured to releasably retain the light-emitting panel (4) and/or the associated mobile computing device (11) within the cavity (19) to releasably couple the light-emitting panel (4) to the support (15).

As to particular embodiments, the support (15) can be configured to releasably engage with at least a portion of the light-emitting panel back surface and/or the associated mobile computing device back surface (17) (which can include the back surface of a case, cover, skin, or the like which may be associated with the mobile computing device (11)).

As to particular embodiments, the light-emitting panel (4) can releasably couple to the support (15) by (i) releasably coupling the light-emitting panel back surface and/or the associated mobile computing device back surface (17) to the support surface (16) or (ii) releasably engaging the light-emitting panel back surface and/or the associated mobile computing device back surface (17) with the support surface (16).

As but one illustrative example, it is herein contemplated that at least a portion of the support surface (16) can include a releasable adhesive which can function to releasably adhere the light-emitting panel back surface and/or the associated mobile computing device back surface (17) to the support surface (16) to releasably couple the light-emitting panel (4) to the support (15).

As but a second illustrative example, it is herein contemplated that each of the support surface (16) and the light-emitting panel back surface and/or the associated mobile computing device back surface (17) can include one of a pair of matable fasteners (for example, hook-and-loop fasteners), whereby upon matable engagement of the matable fasteners (for example, matable engagement of a hook with a loop), the light-emitting panel (4) can be releasably coupled to the support (15).

Now referring primarily to FIG. 6A through FIG. 6D, and FIG. 15, as to particular embodiments, the support (15) can be configured to releasably engage with at least a portion of the light-emitting panel front surface (9) and/or the associated mobile computing device front surface (18) (which can include the front surface of a case, cover, skin, or the like which may be associated with the mobile computing device (11)).

As to particular embodiments, the support (15) can include a resilient element (23) coupled to the cavity (19), for example coupled to the bottom wall (20), whereby the resilient element (23) can be configured to couple to or engage with a portion of the light-emitting panel front surface (9) and/or the associated mobile computing device front surface (18).

The term "resilient" as used herein can mean able to return to substantially its original shape and/or position after being deformed, such as after being stretched, compressed, or bent.

As to particular embodiments, the resilient element (23) can be configured as a resiliently expandable or stretchable element (24) (or an elastic element) (i) coupled to or (ii) connected to the bottom wall (20).

Again referring primarily to FIG. 6A through FIG. 6D, and FIG. 15, as but one illustrative example, the resiliently expandable element (24) can be configured as an elastic band (or strap, or strip, or elongate element, or the like) which can be (i) coupled to or (ii) connected to the bottom wall (20). In particular, the elastic band ends (25) can be (i) coupled to or (ii) connected to the bottom wall (20) (for example, via a mechanical fastener or adhesive) such that the elastic band length (which disposes between the elastic band ends (25)) extends across a portion of the bottom wall (20), creating a pass-through (26) between the elastic band length and the bottom wall (20). As the elastic band can be expandable, when the light-emitting panel (4) and/or the associated mobile computing device (11) is passed through the open end (22), a portion of the light-emitting panel (4) and/or the associated mobile computing device (11) can further be passed through the pass-through (26), which may expand the elastic band (in a direction away from the bottom wall (20)) to allow receipt of the portion of the light-emitting panel (4) and/or the associated mobile computing device (11) within the pass-through (26). Because the elastic band can be resilient, the elastic band can contract slightly from its expanded condition to engage with at least a portion of the light-emitting panel front surface (9) and/or the associated mobile computing device front surface (18) to effectively retain the light-emitting panel (4) and/or the associated mobile computing device (11) within the cavity (19), thereby releasably coupling the light-emitting panel (4) to the support (15).

As to particular embodiments, the elastic band can be (i) coupled to or (ii) connected to the bottom wall (20) in such a location that when engaged with the light-emitting panel front surface (9) and/or the associated mobile computing device front surface (18), the elastic band does not overlay the portion of the light-emitting panel (4) which provides light (6) to illuminate at least a portion of a page (2) of the illuminatable assembly (1).

Of course, it is herein contemplated that more than one elastic band can be used to releasably couple the light-emitting panel (4) to the support (15). For example, a pair of elastic bands can be (i) coupled to or (ii) connected to the bottom wall (20) such that each elastic band length extends across a portion of the bottom wall (20) (i) between the two opposing longer side walls and (ii) proximate one of the two opposing shorter side walls. In this way, the pair of elastic bands can extend over the light-emitting panel (4) and/or the associated mobile computing device (11) and engage with a portion of the light-emitting panel front surface (9) and/or the associated mobile computing device front surface (18) proximate each opposing end of the light-emitting panel (4) and/or the associated mobile computing device (11), thereby not overlaying the portion of the light-emitting panel (4) which provides light (6) to illuminate at least a portion of a page (2) of the illuminatable assembly (1).

As to particular embodiments, in addition to releasably retaining the light-emitting panel (4) and/or the associated mobile computing device (11) within the cavity (19), the resilient element(s) (23) may also be useful for permitting the accommodation of variably-sized light-emitting panels (4) and/or associated mobile computing devices (11) within the cavity (19), whereby the amount of expansion of the resilient element(s) (23) can relate to the size of the specific light-emitting panel (4) and/or associated mobile computing device (11). For example, the resilient element(s) (23) can expand a relatively greater amount to accommodate a larger light-emitting panel (4) and/or associated mobile computing device (11). Vice versa, the resilient element(s) (23) can expand a relatively lesser amount to accommodate a smaller light-emitting panel (4) and/or associated mobile computing device (11). In this way, the resilient element(s) (23) may provide a "universal" support (15) for supporting a wide array of light-emitting panels (4) and/or associated mobile computing devices (11), such as mobile computing devices (11) from Apple (for example, an iPhone or an iPad), Samsung, Huawei, Xiaomi, OPPO, Google, LG, Nokia, Nexus, Motorola, Lyf, or the like.

Now referring primarily to FIG. 7A through FIG. 9C, as to particular embodiments, the support (15) can be configured to releasably engage with at least a portion of a light-emitting panel lateral periphery (not shown) and/or the associated mobile computing device lateral periphery (28) (which can include the lateral periphery of a case, cover, skin, or the like which may be associated with the mobile computing device (11)).

As to particular embodiments, the support (15) can include a resilient element (23) coupled to the cavity (19), for example coupled to one or more of the side walls (21) and/or the bottom wall (20). The resilient element (23) can be configured to couple to or engage with at least a portion of the light-emitting panel lateral periphery (such as one or more light-emitting panel sides, one or more light-emitting panel corners, or a combination thereof) and/or the associated mobile computing device lateral periphery (28) (such as one or more mobile computing device sides, one or more mobile computing device corners, or a combination thereof).

Now referring primarily to FIG. 7A through FIG. 8C, as to particular embodiments, the resilient element (23) can be configured as a resiliently expandable or stretchable element (24) (or an elastic element) (i) coupled to or (ii) connected to one or more of the side walls (21) and/or the bottom wall (20).

Now referring primarily to FIG. 7A through FIG. 7D, as but one illustrative example, the resiliently expandable element (24) can be configured as an elastic band (or strap, or strip, or elongate element, or the like), which can be (i) coupled to or (ii) connected to one or more of the side walls (21) and/or the bottom wall (20). In particular, the elastic band ends (25) can be (i) coupled to or (ii) connected to one or more of the side walls (21) and/or the bottom wall (20) (for example, via a mechanical fastener or adhesive) such that the elastic band length (which disposes between the elastic band ends (25)) extends between two opposing side walls (21). As the elastic band can be expandable, when the light-emitting panel (4) and/or the associated mobile computing device (11) is passed through the open end (22), at least a portion of the light-emitting panel lateral periphery and/or the associated mobile computing device lateral periphery (28) (for example, a side of the periphery) can (i) engage with the elastic band and (ii) expand the elastic band (in a direction away from the center of the cavity (19)) to allow receipt of the light-emitting panel (4) and/or the associated mobile computing device (11) within the cavity (19). Because the elastic band can be resilient, the elastic band can contract slightly from its expanded condition to engage with at least a portion of the light-emitting panel lateral periphery and/or the associated mobile computing device lateral periphery (28) (for example, a side of the periphery) to effectively retain the light-emitting panel (4) and/or the associated mobile computing device (11) within the cavity (19), thereby releasably coupling the light-emitting panel (4) to the support (15).

Figure 8A:
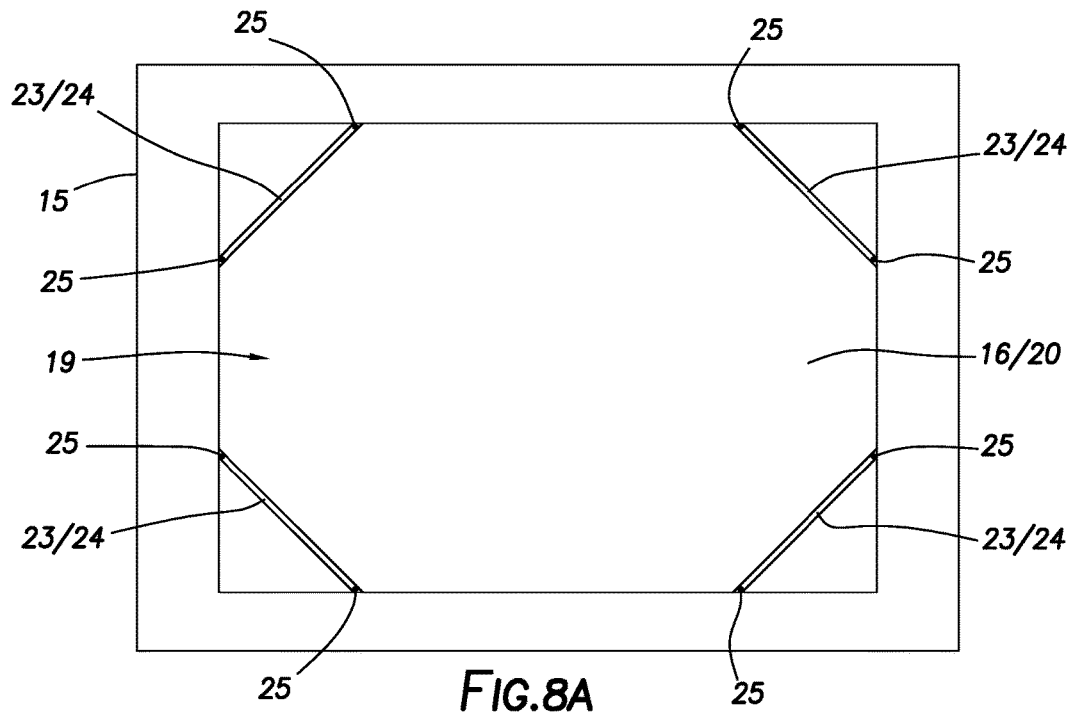
FIG. 8A is a front view of a particular embodiment of a support of the illuminatable assembly.
Figure 8B:
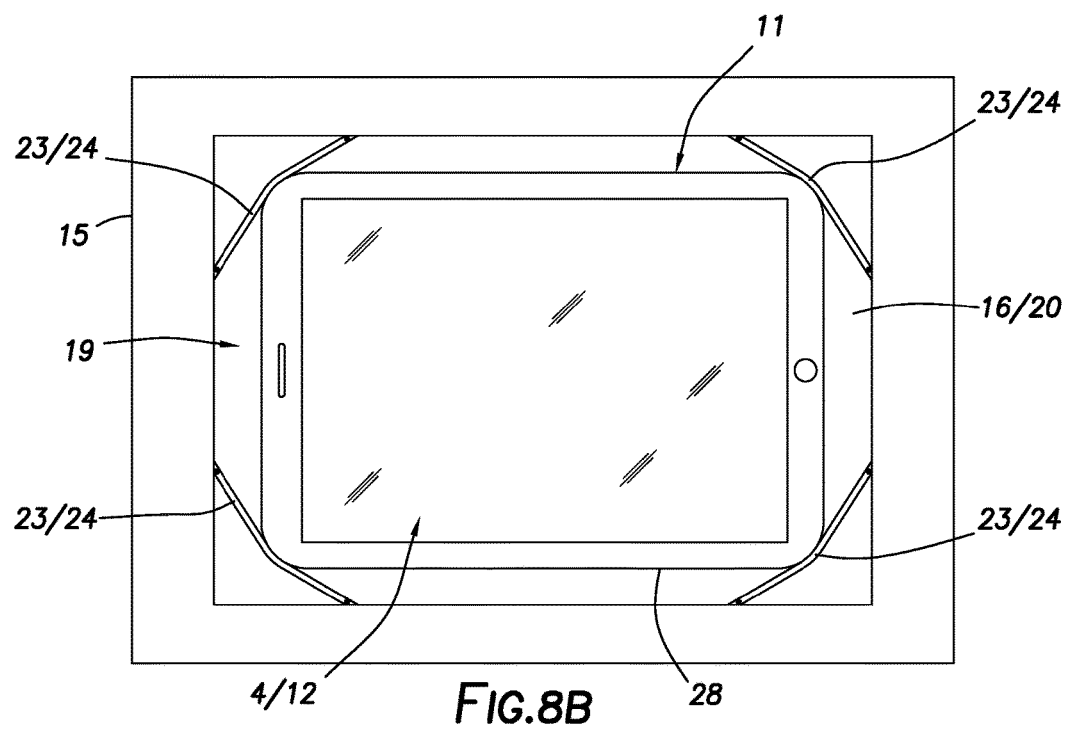
FIG. 8B is a front view of a particular embodiment of the support shown in FIG. 8A, whereby the support is shown supporting a relatively smaller light-emitting panel.
Figure 8C:
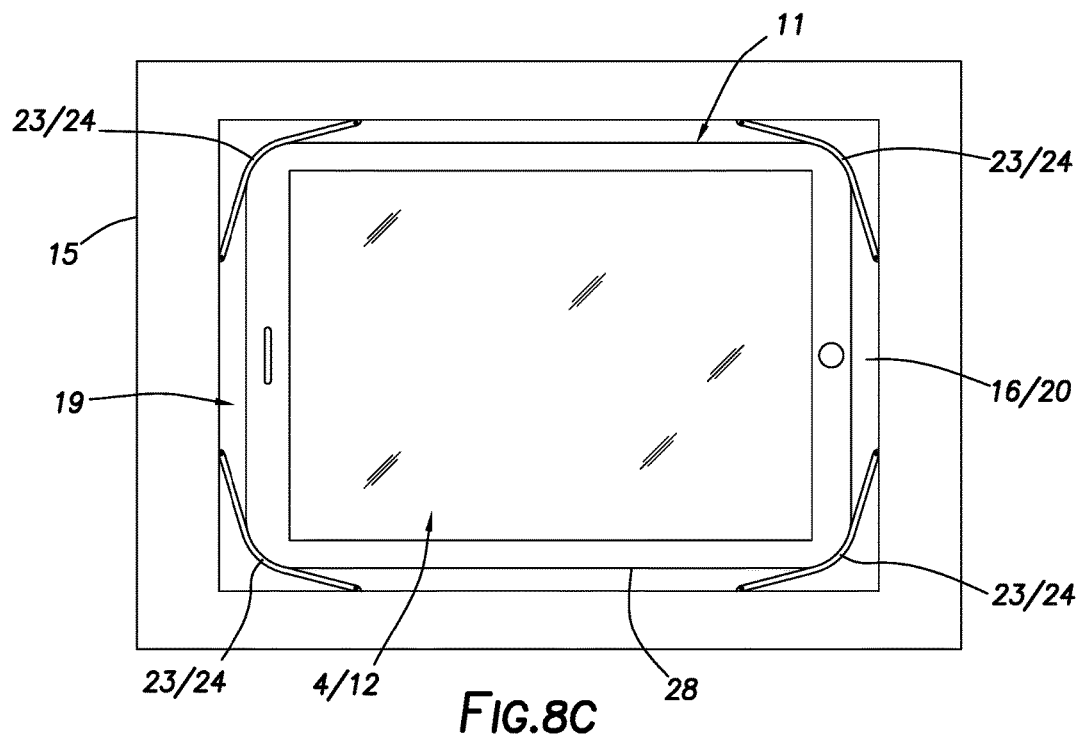
FIG. 8C is a front view of a particular embodiment of the support shown in FIG. 8A, whereby the support is shown supporting a relatively larger light-emitting panel.

Now referring primarily to FIG. 8A through FIG. 8C, as to other particular embodiments, the elastic band ends (25) can be (i) coupled to or (ii) connected to one or more of the side walls (21) and/or the bottom wall (20) such that the elastic band length extends between two adjacent side walls (21). As the elastic band can be expandable, when the light-emitting panel (4) and/or the associated mobile computing device (11) is passed through the open end (22), at least a portion of the light-emitting panel lateral periphery and/or the associated mobile computing device lateral periphery (28) (for example, a corner of the periphery) can (i) engage with the elastic band and (ii) expand the elastic band (in a direction away from the center of the cavity (19)) to allow receipt of the light-emitting panel (4) and/or the associated mobile computing device (11) within the cavity (19). Because the elastic band can be resilient, the elastic band can contract slightly from its expanded condition to engage with at least a portion of the light-emitting panel lateral periphery and/or the associated mobile computing device lateral periphery (28) (for example, a corner of the periphery) to effectively retain the light-emitting panel (4) and/or the associated mobile computing device (11) within the cavity (19), thereby releasably coupling the light-emitting panel (4) to the support (15).

Figure 9A:
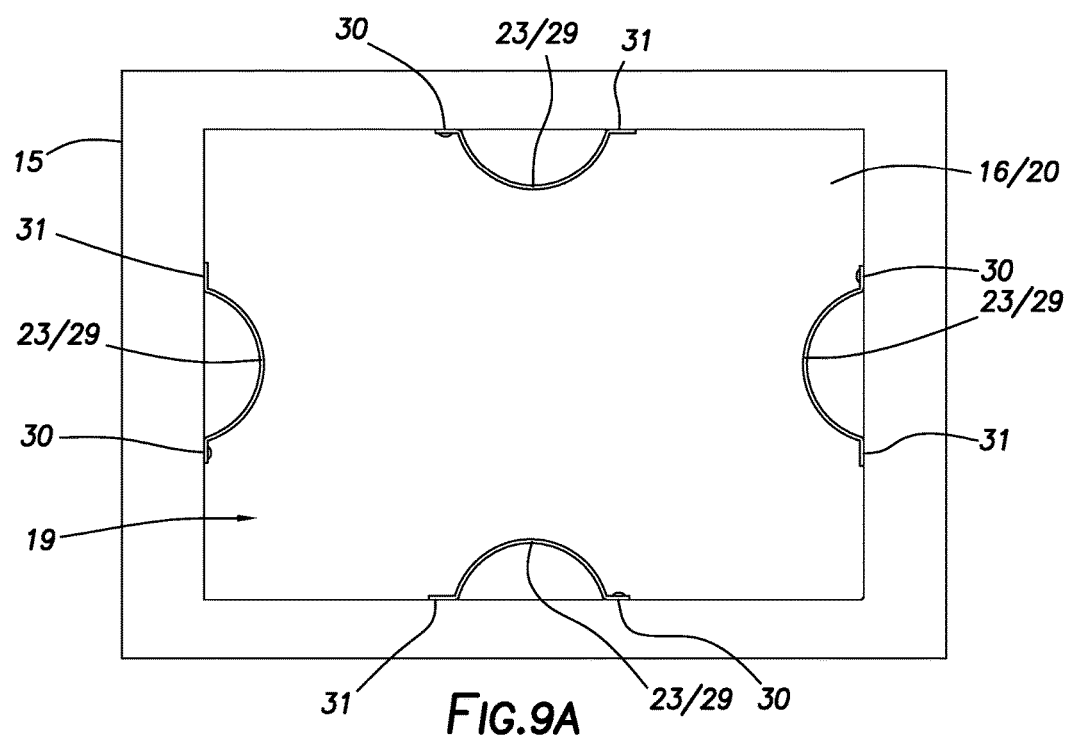
FIG. 9A is a front view of a particular embodiment of a support of the illuminatable assembly.
Figure 9B:
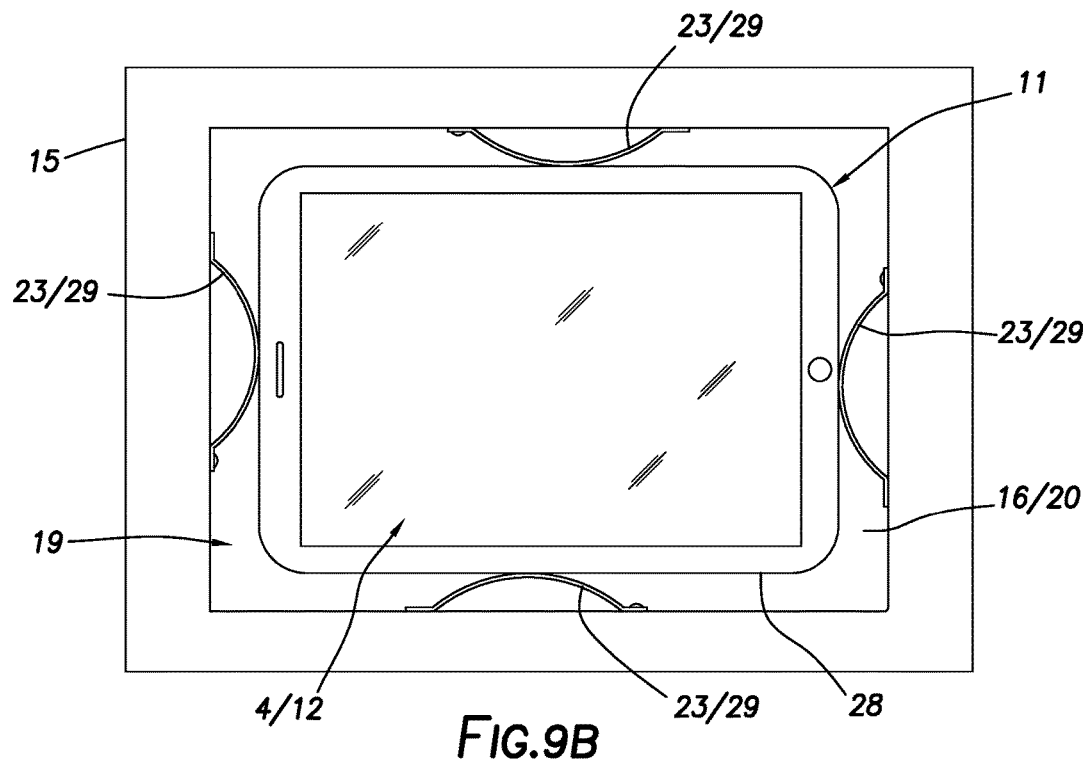
FIG. 9B is a front view of a particular embodiment of the support shown in FIG. 9A, whereby the support is shown supporting a relatively smaller light-emitting panel.
Figure 9C:
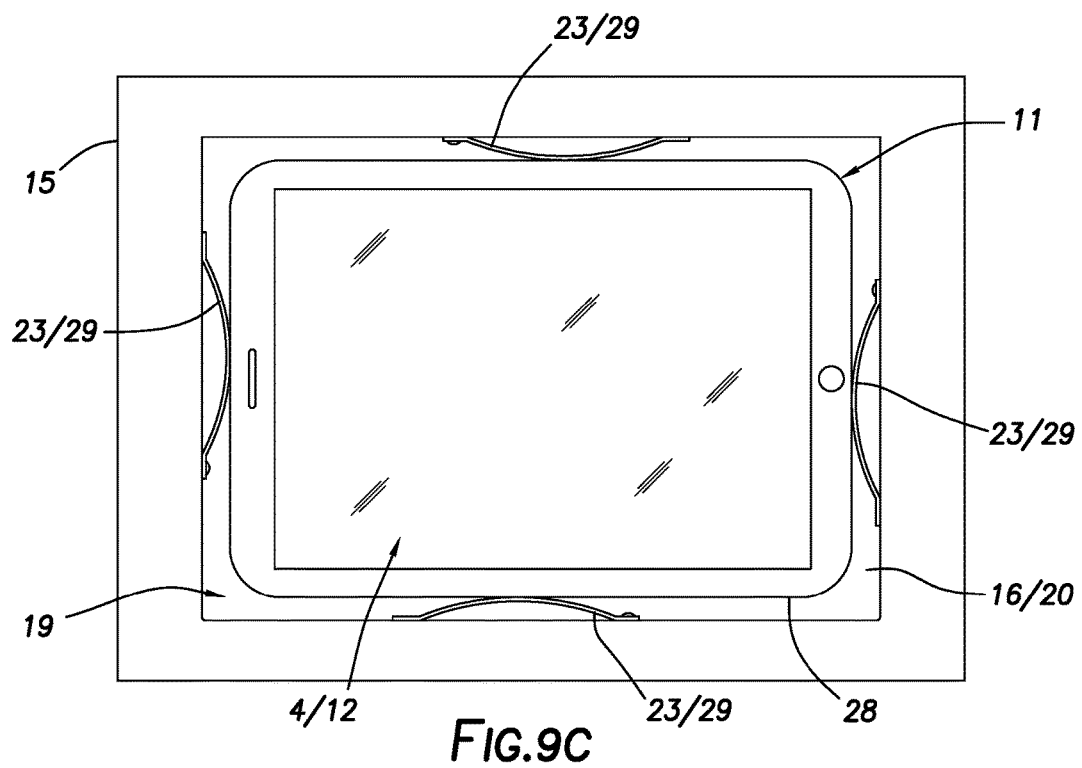
FIG. 9C is a front view of a particular embodiment of the support shown in FIG. 9A, whereby the support is shown supporting a relatively larger light-emitting panel.

Now referring primarily to FIG. 9A through FIG. 9C, as to particular embodiments, the resilient element (23) can be configured as a resiliently compressible element (29) (i) coupled to, (ii) connected to, or (iii) provided by one or more of the side walls (21).

Again referring primarily to FIG. 9A through FIG. 9C, as but one illustrative example, the resiliently compressible element (29) can be configured as a spring which can be (i) coupled to or (ii) connected to one or more of the side walls (21). As to particular embodiments, the spring can be configured as a flat spring which can have at least one end, such as a first end (30), fixedly connected to the side wall (21). As the flat spring can be compressible, when the light-emitting panel (4) and/or the associated mobile computing device (11) is passed through the open end (22), at least a portion of the light-emitting panel lateral periphery and/or the associated mobile computing device lateral periphery (28) can (i) engage with the flat spring and (ii) compress the flat spring (in a direction away from the center of the cavity (19)) to allow receipt of the light-emitting panel (4) and/or the associated mobile computing device (11) within the cavity (19), whereby compression of the flat spring can be at least in part achieved by movement (for example, sliding) of a second end (31) of the flat spring away from the first end (30) which is fixedly connected to the side wall (21). Because the flat spring can be resilient, the flat spring can expand slightly from its compressed condition to engage with at least a portion of the light-emitting panel lateral periphery and/or the associated mobile computing device lateral periphery (28) to effectively retain the light-emitting panel (4) and/or the associated mobile computing device (11) within the cavity (19), thereby releasably coupling the light-emitting panel (4) to the support (15).

As but a second illustrative example, the resiliently compressible element (29) can be configured as a layer of foam (or foam-like material), which can be (i) coupled to, (ii) connected to, or (iii) provided by one or more of the side walls (21) (not shown). Regarding the latter, the cavity (19) can be disposed within the layer of foam, for example, by die-cutting, so that the foam defines the side walls (21). Additionally, as to particular embodiments, the bottom wall (20) can also be provided by foam. Because the foam can be compressible, when the light-emitting panel (4) and/or the associated mobile computing device (11) is passed through the open end (22), at least a portion of the light-emitting panel lateral periphery and/or the associated mobile computing device lateral periphery (28) can (i) engage with the foam providing the side walls (21) and (ii) compress the foam (in a direction away from the center of the cavity (19)) to allow receipt of the light-emitting panel (4) and/or the associated mobile computing device (11) within the cavity (19). Because the foam can be resilient, the foam can expand slightly from its compressed condition to engage with at least a portion of the light-emitting panel lateral periphery and/or the associated mobile computing device lateral periphery (28) to effectively retain the light-emitting panel (4) and/or the associated mobile computing device (11) within the cavity (19), thereby releasably coupling the light-emitting panel (4) to the support (15).

As to particular embodiments, in addition to releasably retaining the light-emitting panel (4) and/or the associated mobile computing device (11) within the cavity (19), the resilient element (23) may also be useful for positioning or centering the light-emitting panel (4) and/or the associated mobile computing device (11) within the cavity (19), whereby for centering, the one or more resilient elements (23) can be configured within the cavity (19) to provide equal and opposite inwardly directed forces.

For example, for vertical centering, a first resilient element can provide an inwardly directed force to a top of the light-emitting panel lateral periphery and/or the associated mobile computing device lateral periphery (28) and a second resilient element can provide an inwardly directed force to a bottom of the light-emitting panel lateral periphery and/or the associated mobile computing device lateral periphery (28), thereby effectively vertically centering the light-emitting panel (4) and/or the associated mobile computing device (11) between the first and second resilient elements.

Likewise, for horizontal centering, a first resilient element can provide an inwardly directed force to a left side of the light-emitting panel lateral periphery and/or the associated mobile computing device lateral periphery (28) and a second resilient element can provide an inwardly directed force to a right side of the light-emitting panel lateral periphery and/or the associated mobile computing device lateral periphery (28), thereby effectively horizontally centering the light-emitting panel (4) and/or the associated mobile computing device (11) between the first and second resilient elements.

Alternatively, for vertical and horizontal centering, a first resilient element can provide an inwardly directed force to a top corner of the light-emitting panel lateral periphery and/or the associated mobile computing device lateral periphery (28) and a second resilient element can provide an inwardly directed force to a diagonally opposite bottom corner of the light-emitting panel lateral periphery and/or the associated mobile computing device lateral periphery (28), thereby effectively vertically and horizontally centering the light-emitting panel (4) and/or the associated mobile computing device (11) between the first and second resilient elements.

Optionally, a first resilient element can provide an inwardly directed force to a top left corner of the light-emitting panel lateral periphery and/or the associated mobile computing device lateral periphery (28), a second resilient element can provide an inwardly directed force to a diagonally opposite bottom right corner of the light-emitting panel lateral periphery and/or the associated mobile computing device lateral periphery (28), a third resilient element can provide an inwardly directed force to a top right corner of the light-emitting panel lateral periphery and/or the associated mobile computing device lateral periphery (28), and a fourth resilient element can provide an inwardly directed force to a diagonally opposite bottom left corner of the light-emitting panel lateral periphery and/or the associated mobile computing device lateral periphery (28), thereby effectively vertically and horizontally centering the light-emitting panel (4) and/or the associated mobile computing device (11) between these resilient elements.

As to particular embodiments, in addition to releasably retaining the light-emitting panel (4) and/or the associated mobile computing device (11) within the cavity (19) and centering the light-emitting panel (4) and/or the associated mobile computing device (11) within the cavity (19), the resilient element(s) (23) may also be useful for permitting the accommodation of variably-sized light-emitting panels (4) and/or associated mobile computing devices (11) within the cavity (19), whereby the amount of expansion or compression of the resilient element(s) (23) can relate to the size of the specific light-emitting panel (4) and/or associated mobile computing device (11). For example, the resilient element(s) (23) can expand or compress a greater amount to accommodate a larger light-emitting panel (4) and/or associated mobile computing device (11). Vice versa, the resilient element(s) (23) can expand or compress a lesser amount to accommodate a smaller light-emitting panel (4) and/or associated mobile computing device (11). In this way, the resilient element(s) (23) may provide a "universal" support (15) for supporting a wide array of light-emitting panels (4) and/or associated mobile computing devices (11), whereby examples of such mobile computing devices (11) are listed above.

Light Transmission Portion

Now referring primarily to FIG. 4A through FIG. 5C, and FIG. 11 through FIG. 14L, the sheet (3) can include at least one light transmission portion (32) disposed within the sheet (3), whereby the light transmission portion (32) can communicate between the sheet front and back surfaces (7)(8) to provide or define a light transmission pathway (33).

Correspondingly, when the sheet (3) disposes in the first position (13) and the light-emitting panel (4) is in an activated condition (5) to provide light (6), the light (6) can be transmitted from the light-emitting panel (4) through the light transmission portion (32) of the sheet (3) and consequently, along the light transmission pathway (33) such that the light (6) can be viewable by a viewer (34) of the sheet front surface (7).

As to particular embodiments, the light transmission portion (32) can be formed from (i) a substantially transparent material or (ii) a transparent material, which can allow (i) substantially the entirety of the light (6) or (ii) the entirety of the light (6) from the portion of the light-emitting panel (4) underlaying the transparent material to be transmitted through the transparent material and correspondingly, through the sheet (3), whereby the light (6) can be viewable by a viewer (34) of the sheet front surface (7).

As to particular embodiments, the light transmission portion (32) can be formed from a translucent material, which can allow a portion of the light (6) from the portion of the light-emitting panel (4) underlaying the translucent material to be transmitted through the translucent material and correspondingly, through the sheet (3), whereby the light (6) can be viewable by a viewer (34) of the sheet front surface (7).

Now referring primarily to FIG. 5A through FIG. 5C, and FIG. 11 through FIG. 14L, as to particular embodiments, the light transmission portion (32) can be configured as an aperture element (35) defining an aperture element opening (36) communicating between the sheet front and back surfaces (7)(8). The aperture element opening (36) can allow at least a portion of the light (6) from the portion of the light-emitting panel (4) underlaying the aperture element opening (36) to be transmitted through the aperture element opening (36) and correspondingly, through the sheet (3), whereby the light (6) can be viewable by a viewer (34) of the sheet front surface (7).

The aperture element (35) can define an aperture element opening (36) having any of a numerous and wide variety of configurations, depending upon the embodiment. As illustrative examples, the aperture element (35) can define an aperture element opening (36) configured as an alphabetical character, a numerical character, a shape or form (such as a shape or form corresponding to an image or the outline of an image), or the like, or combinations thereof. However, the invention need not be so limited, as the aperture element (35) can define an aperture element opening (36) having any configuration which may be useful for conveying a story, tale, narrative, lesson, or the like, described within one or more pages (2) of the illuminatable assembly (1).

The sheet (3), within which the one or more light transmission portions (32) are disposed, can be formed from a numerous and wide variety of materials, as described above, depending upon the embodiment. As to particular embodiments, the sheet (3) can be formed from (i) a substantially opaque material or (ii) an opaque material (such as (i) substantially opaque or (ii) opaque paper or paper-like material) which precludes light transmission. Accordingly, the light (6) provided by the light-emitting panel (4) can only be transmitted through areas of the sheet (3) having a light transmission portion (32).

Indicium

Figure 12A:
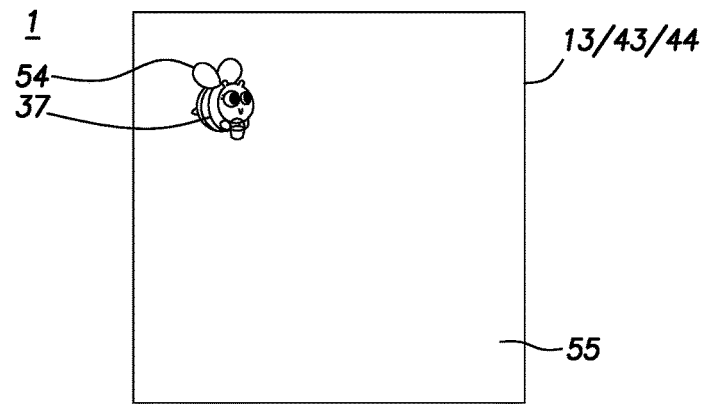
FIG. 12A is an isometric view of a particular embodiment of the illuminated assembly having five sheets movably coupled to a support, whereby the first, second, third, fourth, and fifth sheets dispose in a first position and/or overlayingly engage the support.
Figure 12B:
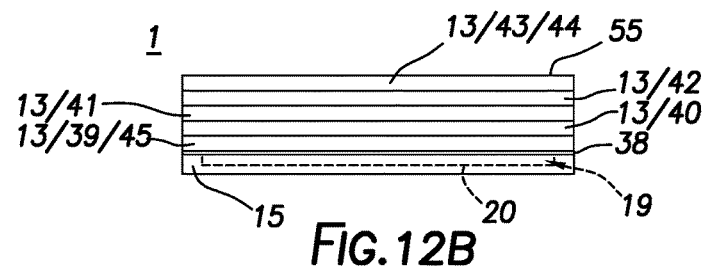
FIG. 12B is a bottom view of the particular embodiment of the illuminated assembly shown in FIG. 12A.
Figure 12C:
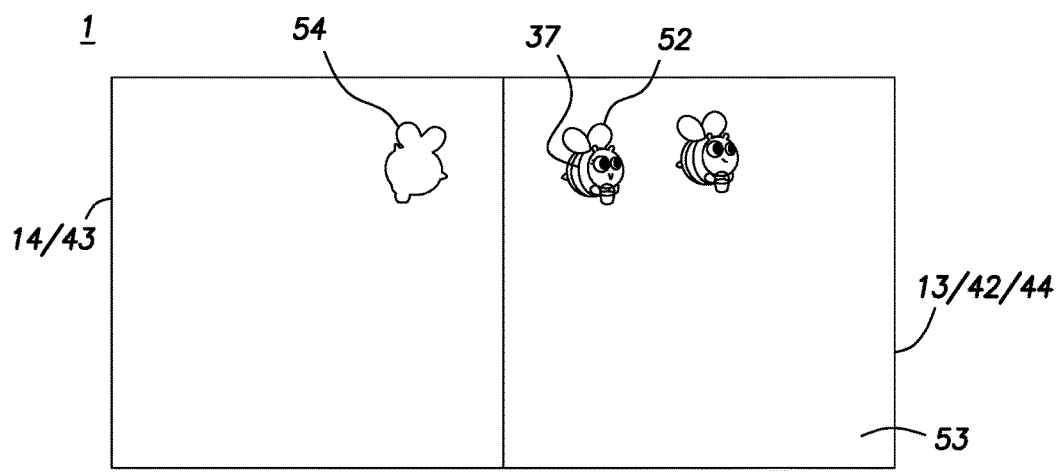
FIG. 12C is an isometric view of the particular embodiment of the illuminated assembly shown in FIG. 12A, but whereby the first, second, third, and fourth sheets dispose in a first position and/or overlayingly engage the support, and the fifth sheet disposes in a second position and/or disposes away from the support.
Figure 12D:
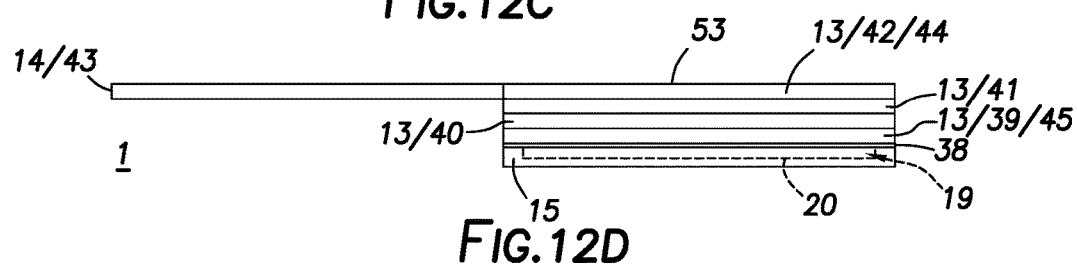
FIG. 12D is a bottom view of the particular embodiment of the illuminated assembly shown in FIG. 12C.
Figure 12E:
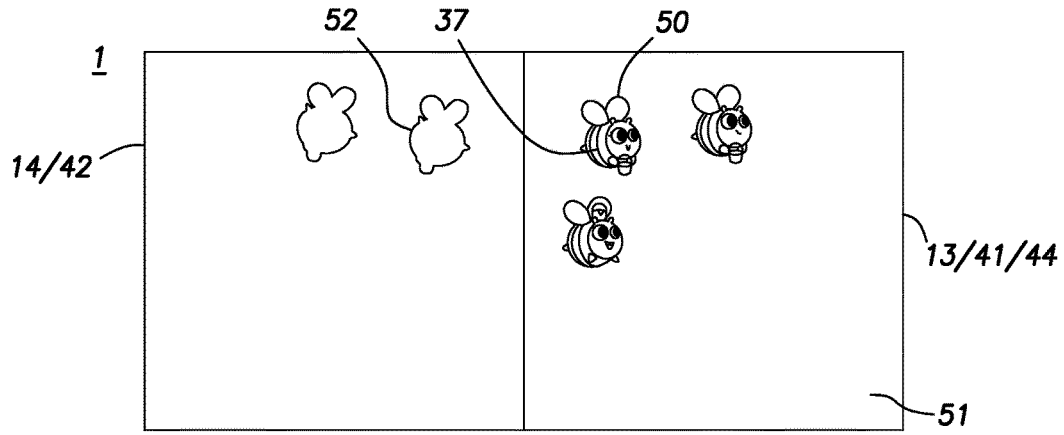
FIG. 12E is an isometric view of the particular embodiment of the illuminated assembly shown in FIG. 12A, but whereby the first, second, and third sheets dispose in a first position and/or overlayingly engage the support, and the fourth and fifth sheets dispose in a second position and/or dispose away from the support.
Figure 12F:
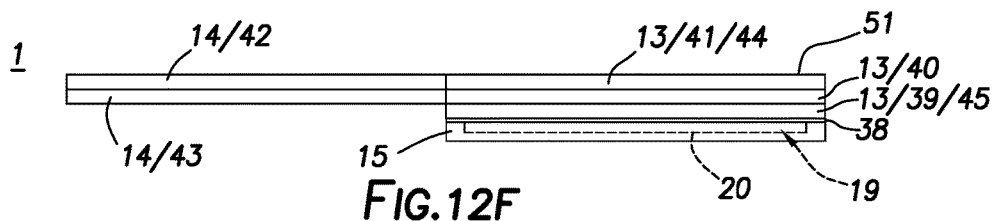
FIG. 12F is a bottom view of the particular embodiment of the illuminated assembly shown in FIG. 12E.
Figure 12G:
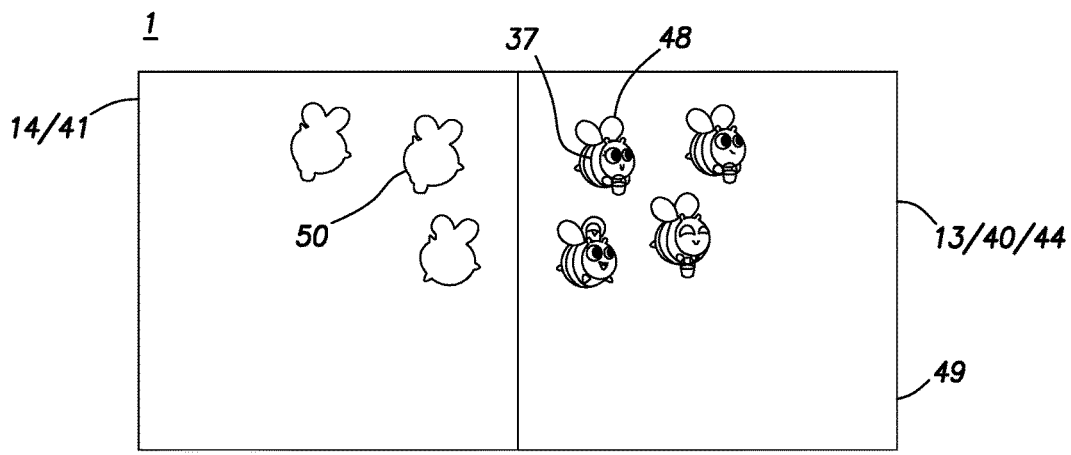
FIG. 12G is an isometric view of the particular embodiment of the illuminated assembly shown in FIG. 12A, but whereby the first and second sheets dispose in a first position and/or overlayingly engage the support, and the third, fourth, and fifth sheets dispose in a second position and/or dispose away from the support.
Figure 12H:
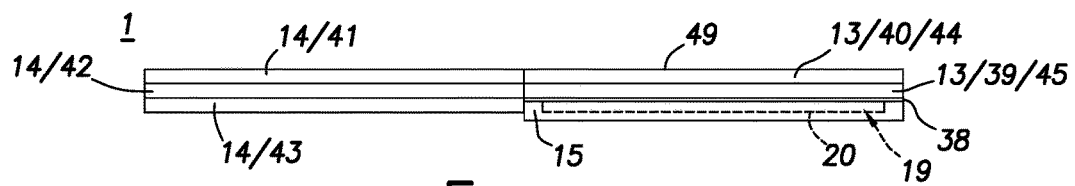
FIG. 12H is a bottom view of the particular embodiment of the illuminated assembly shown in FIG. 12G.
Figure 12I:
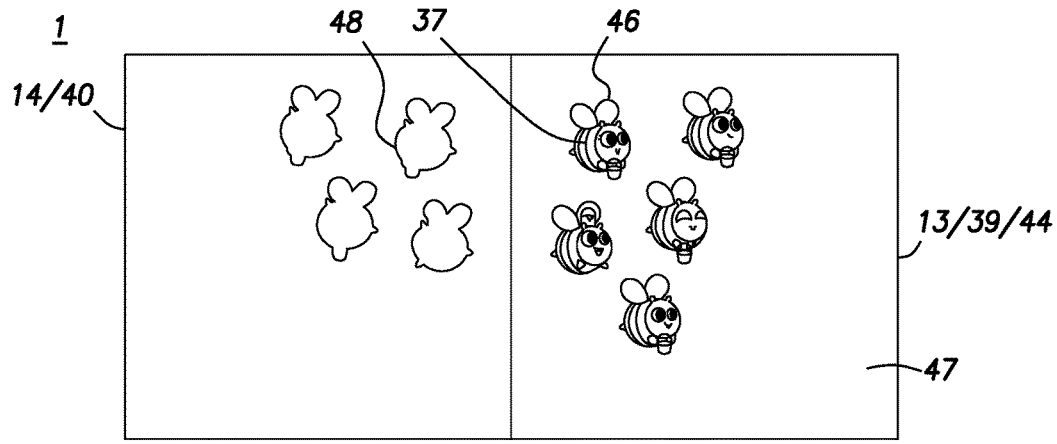
FIG. 12I is an isometric view of the particular embodiment of the illuminated assembly shown in FIG. 12A, but whereby the first sheet disposes in a first position and/or overlayingly engages the support, and the second, third, fourth, and fifth sheets dispose in a second position and/or dispose away from the support.
Figure 12J:
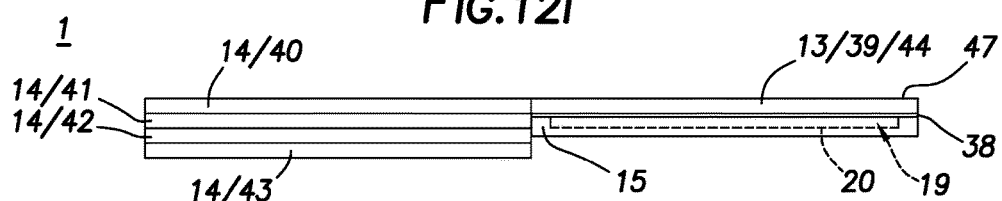
FIG. 12J is a bottom view of the particular embodiment of the illuminated assembly shown in FIG. 12I.
Figure 12K:
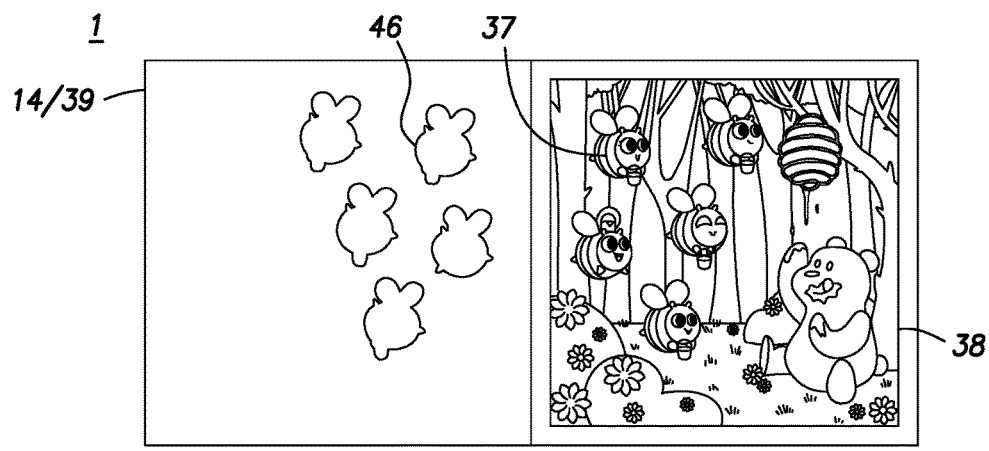
FIG. 12K is an isometric view of the particular embodiment of the illuminated assembly shown in FIG. 12A, but whereby the first, second, third, fourth, and fifth sheets dispose in a second position and/or dispose away from the support.
Figure 12L:
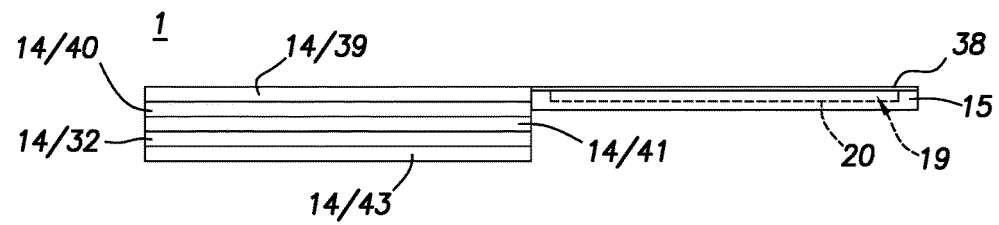
FIG. 12L is a bottom view of the particular embodiment of the illuminated assembly shown in FIG. 12K.

Now referring primarily to FIG. 11 through FIG. 12L, as to particular embodiments, the illuminatable assembly (1) can further include at least one illuminatable indicium (37), such as an alphabetical character, a numerical character, a shape, a form, an image, or the like, or combinations thereof, which can be viewable (i) via, (ii) by way of, or (iii) through the light transmission portion (32) of the sheet (3). Particularly, when the sheet (3) disposes in the first position (13) and the light-emitting panel (4) is in an activated condition (5) to provide light (6), the light (6) can be transmitted from the light-emitting panel (4) through the illuminatable indicium (37) to illuminate the indicium (37) and correspondingly, provide an illuminated indicium (37) which can be viewable via the light transmission portion (32) of the sheet (3) by a viewer (34) of the sheet front surface (7).

As to particular embodiments, the illuminatable indicium (37) can be viewable through the light transmission portion (32) of the sheet (3) overlaying the illuminatable indicium (37). For example, when the light transmission portion (32) comprises an aperture element (35), the illuminatable indicium (37) can be viewable through the aperture element opening (36) defined by the aperture element (35) overlaying the illuminatable indicium (37). In this way, the illuminatable indicium (37) can be illuminated from behind by the light-emitting panel (4).

Now referring primarily to FIG. 10A through FIG. 12L, as to particular embodiments, at least one illuminatable indicium (37) can be coupled to or disposed on a layer (38) coupled to the illuminatable assembly (1). Of note, as to particular embodiments, the layer (38) can be discrete from the light-emitting panel (4).

The layer (38) can be disposed between the sheet (3) and the support (15) configured to support the light-emitting panel (4), correspondingly also disposing the layer (38) between the sheet (3) and the light-emitting panel (4). As to particular embodiments, the layer (38) can overlay the light-emitting panel front surface (9) or be in overlaying engagement with the light-emitting panel front surface (9). Following, when the sheet (3) disposes in the first position (13), the layer (38) can dispose between the sheet back surface (8) and the light-emitting panel front surface (9).

As to particular embodiments, the illuminatable indicium (37) and/or the layer (38) can comprise or be formed (either partially or entirely) from a translucent material, whereby as non-limiting examples, the translucent material can include backlit film, backlit graphic film, duratrans, DURA-TRANS®, vellum, parchment paper, or the like.

As to particular embodiments, the layer (38) can comprise or be formed (either partially or entirely) from (i) a substantially transparent material or (ii) a transparent material, whereby as non-limiting examples, (i) the substantially transparent material or (ii) the transparent material can include transparency film, transparency paper, viewfoil, foil, viewgraph, or the like, which can be made from (i) a substantially transparent material or (ii) a transparent material, such as cellulose acetate.

As to particular embodiments, the illuminatable indicium (37) can be printed on the layer (38); as such, the illuminatable indicium (37) can comprise or be provided by any of a numerous and wide variety of conventional or non-conventional inks, an illuminating ink (such as fluorescent ink, a luminescent ink, or a phosphorescent ink), or the like, or combinations thereof.

As to particular embodiments, the illuminatable assembly (1) can further include at least one non-illuminatable indicium, such as an alphabetical character, a numerical character, a shape, a form, an image, or the like, or combinations thereof, coupled to or disposed on the sheet (3), such as on the sheet front and/or back surface (7)(8), for example by printing, whereby the non-illuminatable indicium may be similar to text and/or illustrations in a conventional book.

Plurality of Sheets

Now referring primarily to FIG. 2 through FIG. 3G, and FIG. 11 through FIG. 15A, as to particular embodiments, the illuminatable assembly (1) can include a plurality of pages (2) coupled to the light-emitting panel (4), whereby each page (2) can be provided by a sheet (3). Following, the illuminatable assembly (1) can include a plurality of sheets (3) coupled together, whereby each sheet (3) can be configured as described above.

Accordingly, each sheet (3) can include a sheet front surface (7) opposite a sheet back surface (8), whereby each sheet (3) can be capable of overlaying engagement with the support (15) configured to support the light-emitting panel (4) and correspondingly, each sheet (3) can be capable of overlaying engagement with the light-emitting panel (4). As to particular embodiments, each sheet's back surface (8) can be capable of overlaying engagement with the light-emitting panel front surface (9).

Now referring primarily to FIG. 2 through FIG. 3G, and FIG. 11 through FIG. 14L, as to particular embodiments, the support (15)/light-emitting panel (4) can dispose rearwardly or proximate the rear or back of the illuminatable assembly (1) and the plurality of sheets (3) can dispose frontwardly or proximate the front of the illuminatable assembly (1).

Now referring primarily to FIG. 12I, FIG. 12J, FIG. 14I, and FIG. 14J, as an illustrative example of a particular embodiment of the illuminatable assembly (1) including a support (15)/light-emitting panel (4) disposed proximate the rear or back of the illuminatable assembly (1) and five sheets (3) coupled together, a first sheet (39) disposed in the first position (13) can be in overlaying engagement with the support (15)/light-emitting panel (4).

Now referring primarily to FIG. 12G, FIG. 12H, FIG. 14G, and FIG. 14H, continuing with the illustrative example, a second sheet (40) disposed in the first position (13) can be in overlaying engagement with the support (15)/light-emitting panel (4). Additionally, the second sheet (40) disposed in the first position (13) can be in overlaying engagement with the first sheet (39). Said another way, the first sheet (39) can dispose between the second sheet (40) and the support (15)/light-emitting panel (4).

Now referring primarily to FIG. 12E, FIG. 12F, FIG. 14E, and FIG. 14F, continuing with the illustrative example, a third sheet (41) disposed in the first position (13) can be in overlaying engagement with the support (15)/light-emitting panel (4). Additionally, the third sheet (41) disposed in the first position (13) can be in overlaying engagement with the second sheet (40) and the first sheet (39). Said another way, the second and first sheets (40)(39) can dispose between the third sheet (41) and the support (15)/light-emitting panel (4).

Now referring primarily to FIG. 12C, FIG. 12D, FIG. 14C, and FIG. 14D, continuing with the illustrative example, a fourth sheet (42) disposed in the first position (13) can be in overlaying engagement with the support (15)/light-emitting panel (4). Additionally, the fourth sheet (42) disposed in the first position (13) can be in overlaying engagement with the third sheet (41), the second sheet (40), and the first sheet (39). Said another way, the third, second, and first sheets (41)(40)(39) can dispose between the fourth sheet (42) and the support (15)/light-emitting panel (4).

Now referring primarily to FIG. 12A, FIG. 12B, FIG. 14A, and FIG. 14B, continuing with the illustrative example, a fifth sheet (43) disposed in the first position (13) can be in overlaying engagement with the support (15)/light-emitting panel (4). Additionally, the fifth sheet (43) disposed in the first position (13) can be in overlaying engagement with the fourth sheet (42), the third sheet (41), the second sheet (40), and the first sheet (39). Said another way, the fourth, third, second, and first sheets (42)(41)(40)(39) can dispose between the fifth sheet (43) and the support (15)/light-emitting panel (4).

Of course it is herein contemplated that any number of pages (2)/sheets (3) can be included in an embodiment of the illuminatable assembly (1), whether it be one page (2)/sheet (3), two pages (2)/sheets (3), three pages (2)/sheets (3), four pages (2)/sheets (3), five pages (2)/sheets (3), or any number of additional pages (2)/sheets (3) which can be added in a manner similar to that described above for the illustrative example including five pages (2)/sheets (3).

Each of the plurality of sheets (3) can further include at least one light transmission portion (32) disposed therein, whereby the light transmission portion (32) can communicate between the sheet front and back surfaces (7)(8), as described above.

As to particular embodiments, each of the plurality of sheets (3) can include at least one light transmission portion (32) which can be capable of overlaying engagement with at least one light transmission portion (32) of another sheet (3).

As to particular embodiments, each of the plurality of sheets (3) can include at least one light transmission portion (32) which can be capable of overlaying engagement with at least one light transmission portion (32) of each of the other sheets (3).

Following, when at least two of the sheets (3) dispose in the first position (13), their light transmission portions (32) can be in overlaying engagement to provide aligned light transmission portions (32), whereby the aligned light transmission portions (32) can provide or define the light transmission pathway (33) between the light-emitting panel (4) and the sheet front surface (7) of the outermost sheet (44).

As used herein, the "outermost sheet" means the sheet (3) of all of sheets (3) disposed in the first position (13) which disposes farthest from the support (15)/light-emitting panel (4) (and/or the light-emitting panel front surface (9)). As to particular embodiments, the outermost sheet (44) can be the frontmost sheet or the sheet (3) of all of sheets (3) disposed in the first position (13) which disposes closest to the front of the illuminatable assembly (1). Correspondingly, the sheet (3) of all the sheets (3) disposed in the first position (13) which disposes closest to the support (15)/light-emitting panel (4) (and/or the light-emitting panel front surface (9)) can be referred to as the innermost sheet (45). As to particular embodiments, the innermost sheet (45) can be the rearmost sheet or the sheet (3) of all of sheets (3) disposed in the first position (13) which disposes closest to the rear or back of the illuminatable assembly (1).

Following, when the sheets (3) dispose in the first position (13) and the light-emitting panel (4) is in an activated condition (5) to provide light (6), the light (6) can be transmitted from the light-emitting panel (4) through the aligned light transmission portions (32) and along the light transmission pathway (33) such that the light (6) can be viewable by a viewer (34) of the sheet front surface (7) of the outermost sheet (44).

Now referring primarily to FIG. 11 through FIG. 14L, continuing with the above-described illustrative example of a particular embodiment of the illuminatable assembly (1) including a support (15)/light-emitting panel (4) disposed proximate the rear or back of the illuminatable assembly (1) and five sheets (3) coupled together, each sheet (39)(40)(41) (42)(43) can include at least one light transmission portion (32) which can be capable of overlaying engagement with at least one light transmission portion (32) of each of the other sheets (3). Within the illuminatable assembly (1), the first sheet (39) can be the innermost sheet (45) which disposes closest to the support (15)/light-emitting panel (4) when in the first position (13). The second sheet (40) can dispose next to the first sheet (39), whereby the first sheet (39) can dispose between the second sheet (40) and the support (15)/light-emitting panel (4). The third sheet (41) can dispose next to the second sheet (40), whereby the second sheet (40) can dispose between the third sheet (41) and the first sheet (39). The fourth sheet (42) can dispose next to the third sheet (41), whereby the third sheet (41) can dispose between the fourth sheet (42) and the second sheet (40). The fifth sheet (43) can dispose next to the fourth sheet (42), whereby the fourth sheet (42) can dispose between the fifth sheet (43) and the third sheet (41). In this particular example including these five sheets (39)(40)(41)(42)(43) coupled together, the fifth sheet (43) can be the outermost sheet (44) which disposes farthest from the support (15)/light-emitting panel (4) when in the first position (13).

Now referring primarily to FIG. 12I, FIG. 12J, FIG. 14I, and FIG. 14J, continuing with the illustrative example, when the first sheet (39) disposes in the first position (13) and the second, third, fourth, and fifth sheets (40)(41)(42)(43) dispose in the second position (14), the first sheet (39) can be the outermost sheet (44). Thus, when the light-emitting panel (4) is in an activated condition (5) to provide light (6), the light (6) can be transmitted from the light-emitting panel (4) through the first sheet light transmission portion (46) and consequently, along the light transmission pathway (33) such that the light (6) can be viewable by a viewer (34) of the first sheet front surface (47).

Now referring primarily to FIG. 12G, FIG. 12H, FIG. 14G, and FIG. 14H, continuing with the illustrative example, when the first and second sheets (39)(40) dispose in the first position (13) and the third, fourth, and fifth sheets (41)(42)(43) dispose in the second position (14), the second sheet (40) can be the outermost sheet (44). In this configuration, the first and second sheet light transmission portions (46)(48) can be in overlaying engagement to provide aligned light transmission portions (32) and correspondingly, a light transmission pathway (33) between the light-emitting panel (4) and the second sheet front surface (49). Thus, when the light-emitting panel (4) is in an activated condition (5) to provide light (6), the light (6) can be transmitted from the light-emitting panel (4) through the aligned first and second sheet light transmission portions (46)(48) and consequently, along the light transmission pathway (33) such that the light (6) can be viewable by a viewer (34) of the second sheet front surface (49).

Now referring primarily to FIG. 12E, FIG. 12F, FIG. 14E, and FIG. 14F, continuing with the illustrative example, when the first, second, and third sheets (39)(40)(41) dispose in the first position (13) and the fourth and fifth sheets (42)(43) dispose in the second position (14), the third sheet (41) can be the outermost sheet (44). In this configuration, the first, second, and third sheet light transmission portions (46)(48)(50) can be in overlaying engagement to provide aligned light transmission portions (32) and correspondingly, a light transmission pathway (33) between the light-emitting panel (4) and the third sheet front surface (51). Thus, when the light-emitting panel (4) is in an activated condition (5) to provide light (6), the light (6) can be transmitted from the light-emitting panel (4) through the aligned first, second, and third sheet light transmission portions (46)(48)(50) and consequently, along the light transmission pathway (33) such that the light (6) can be viewable by a viewer (34) of the third sheet front surface (51).

Now referring primarily to FIG. 12C, FIG. 12D, FIG. 14C, and FIG. 14D, continuing with the illustrative example, when the first, second, third, and fourth sheets (39)(40)(41) (42) dispose in the first position (13) and the fifth sheet (43) disposes in the second position (14), the fourth sheet (42) can be the outermost sheet (44). In this configuration, the first, second, third, and fourth sheet light transmission portions (46)(48)(50)(52) can be in overlaying engagement to provide aligned light transmission portions (32) and correspondingly, a light transmission pathway (33) between the light-emitting panel (4) and the fourth sheet front surface (53). Thus, when the light-emitting panel (4) is in an activated condition (5) to provide light (6), the light (6) can be transmitted from the light-emitting panel (4) through the aligned first, second, third, and fourth sheet light transmission portions (46)(48)(50)(52) and consequently, along the light transmission pathway (33) such that the light (6) can be viewable by a viewer (34) of the fourth sheet front surface (53).

Now referring primarily to FIG. 12A, FIG. 12B, FIG. 14A, and FIG. 14B, continuing with the illustrative example, when the first, second, third, fourth, and fifth sheets (39) (40)(41)(42)(43) dispose in the first position (13), the fifth sheet (43) can be the outermost sheet (44). In this configuration, the first, second, third, fourth, and fifth sheet light transmission portions (46)(48)(50)(52)(54) can be in overlaying engagement to provide aligned light transmission portions (32) and correspondingly, a light transmission pathway (33) between the light-emitting panel (4) and a fifth sheet front surface (55). Thus, when the light-emitting panel (4) is in an activated condition (5) to provide light (6), the light (6) can be transmitted from the light-emitting panel (4) through the aligned first, second, third, fourth, and fifth sheet light transmission portions (46)(48)(50)(52)(54) and consequently, along the light transmission pathway (33) such that the light (6) can be viewable by a viewer (34) of the fifth sheet front surface (55).

Of note, FIG. 12K, FIG. 12L, FIG. 14K, and FIG. 14L show the first, second, third, fourth, and fifth sheets (39) (40)(41)(42)(43) disposed in the second position (14) and correspondingly, the first, second, third, fourth, and fifth sheets (39)(40)(41)(42)(43) can be in non-overlaying engagement with (i) the support (15)/light-emitting panel (4) or disposed away from the support (15)/light-emitting panel (4) and (ii) the layer (38) overlaying the support (15)/light-emitting panel front surface (9) such that an entirety of the layer (38) can be viewable by a viewer (34) of the front surface of the layer (38).

Now referring primarily to FIG. 11 through FIG. 12L, as to particular embodiments, the light transmission portions (32) in overlaying engagement to provide aligned light transmission portions (32) and correspondingly, a light transmission pathway (33), can have the same or a similar perimeter and correspondingly, the same or a similar area.

Figure 14A:
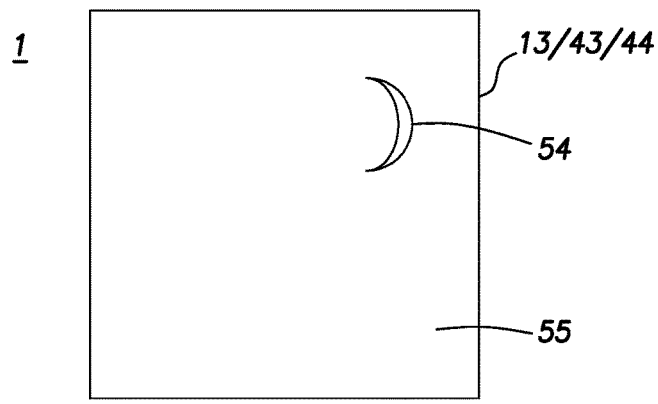
FIG. 14A is an isometric view of a particular embodiment of the illuminated assembly having five sheets movably coupled to a support, whereby the first, second, third, fourth, and fifth sheets dispose in a first position and/or overlayingly engage the support.
Figure 14B:
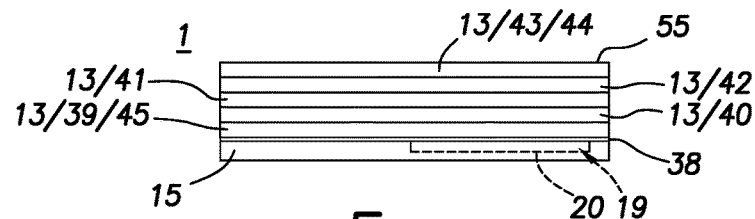
FIG. 14B is a bottom view of the particular embodiment of the illuminated assembly shown in FIG. 14A.
Figure 14C:
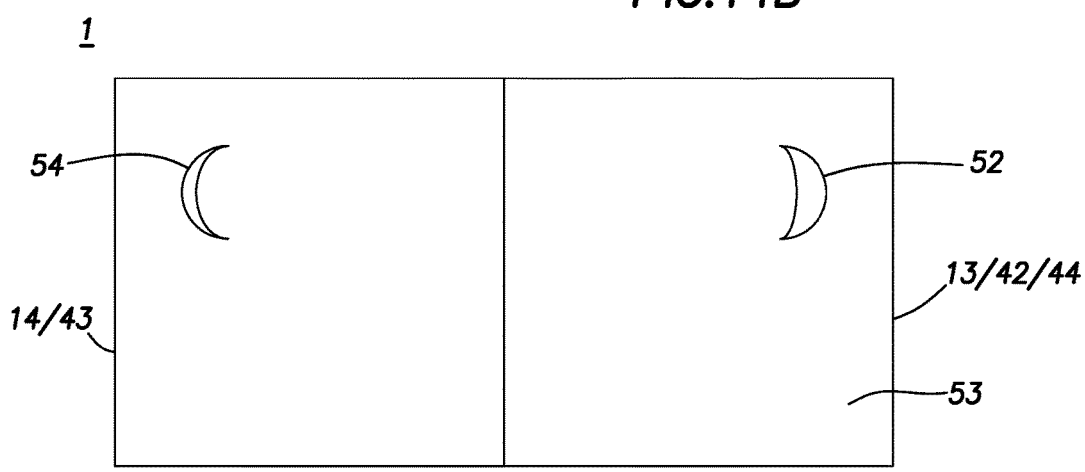
FIG. 14C is an isometric view of the particular embodiment of the illuminated assembly shown in FIG. 14A, but whereby the first, second, third, and fourth sheets dispose in a first position and/or overlayingly engage the support, and the fifth sheet disposes in a second position and/or disposes away from the support.
Figure 14D:
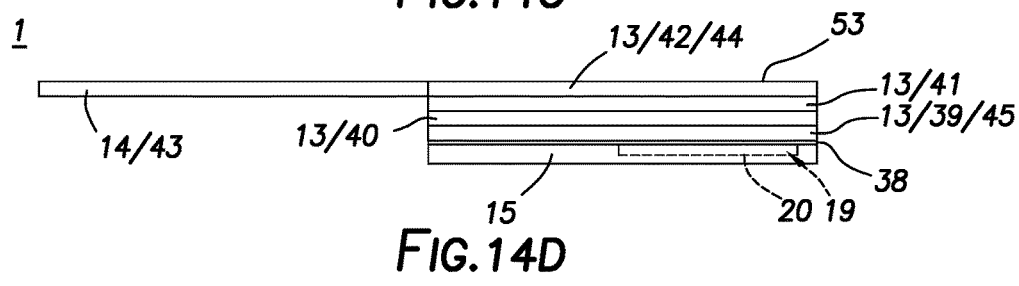
FIG. 14D is a bottom view of the particular embodiment of the illuminated assembly shown in FIG. 14C.
Figure 14E:
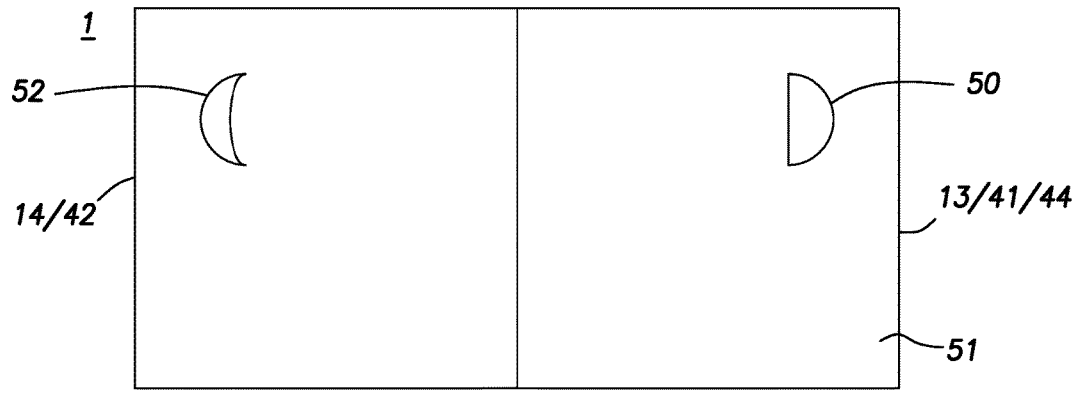
FIG. 14E is an isometric view of the particular embodiment of the illuminated assembly shown in FIG. 12A, but whereby the first, second, and third sheets dispose in a first position and/or overlayingly engage the support, and the fourth and fifth sheets dispose in a second position and/or dispose away from the support.
Figure 14F:
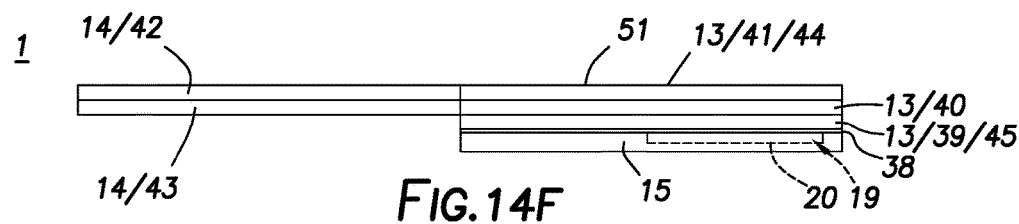
FIG. 14F is a bottom view of the particular embodiment of the illuminated assembly shown in FIG. 14E.
Figure 14G:
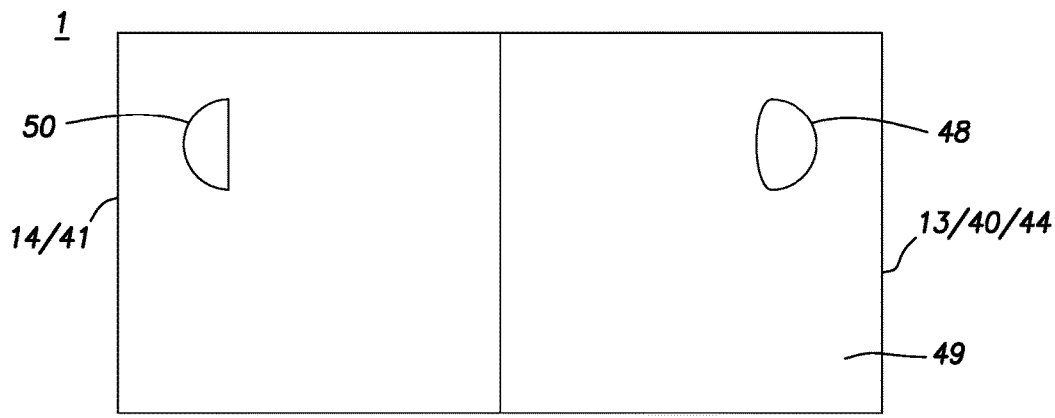
FIG. 14G is an isometric view of the particular embodiment of the illuminated assembly shown in FIG. 14A, but whereby the first and second sheets dispose in a first position and/or overlayingly engage the support, and the third, fourth, and fifth sheets dispose in a second position and/or dispose away from the support.
Figure 14H:
FIG. 14H is a bottom view of the particular embodiment of the illuminated assembly shown in FIG. 14G.
Figure 14I:
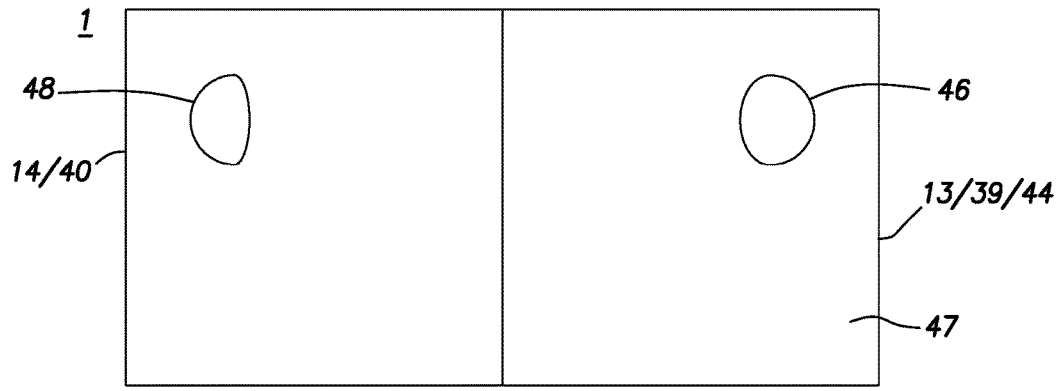
FIG. 14I is an isometric view of the particular embodiment of the illuminated assembly shown in FIG. 14A, but whereby the first sheet disposes in a first position and/or overlayingly engages the support, and the second, third, fourth, and fifth sheets dispose in a second position and/or dispose away from the support.
Figure 14J:
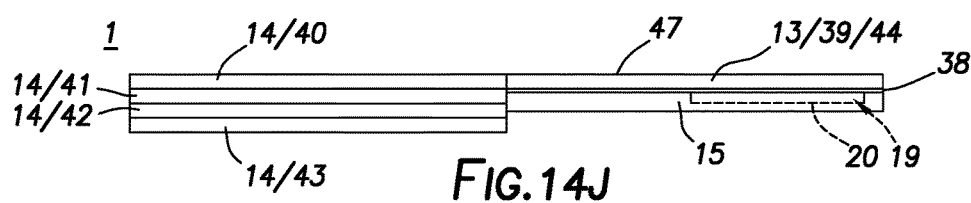
FIG. 14J is a bottom view of the particular embodiment of the illuminated assembly shown in FIG. 14I.
Figure 14K:
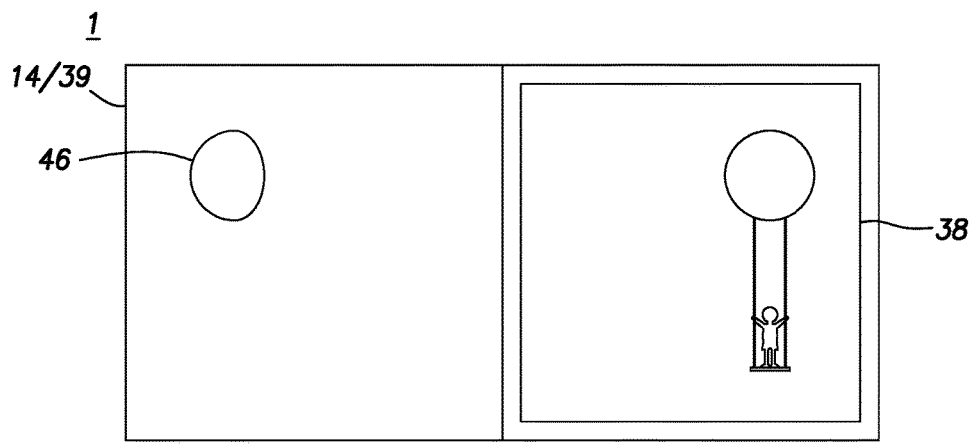
FIG. 14K is an isometric view of the particular embodiment of the illuminated assembly shown in FIG. 14A, but whereby the first, second, third, fourth, and fifth sheets dispose in a second position and/or dispose away from the support.
Figure 14L:
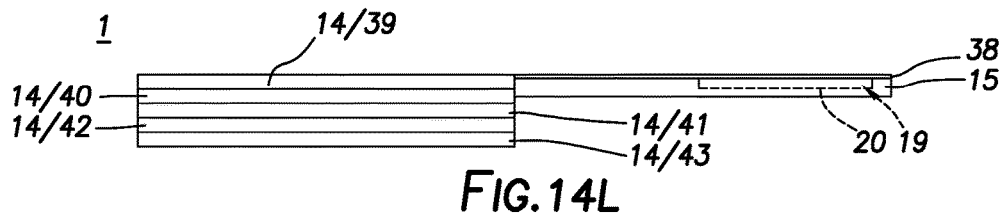
FIG. 14L is a bottom view of the particular embodiment of the illuminated assembly shown in FIG. 14K.

Now referring primarily to FIG. 13 through FIG. 14L, as to particular embodiments, the light transmission portions (32) in overlaying engagement to provide aligned light transmission portions (32) and correspondingly, a light transmission pathway (33), can have differing perimeters and correspondingly, differing areas. As an illustrative example, the perimeters and/or areas of the light transmission portions (32) can increase or be progressively greater/ larger from the outermost sheet (44) to the innermost sheet (45). Said another way, the perimeters and/or areas of the light transmission portions (32) can decrease or be progressively lesser/smaller from the innermost sheet (45) to the outermost sheet (44).

As to these particular embodiments, one or more of the plurality of sheets (3) can include at least one light transmission portion (32) which can be capable of being at least partially obscured by another sheet (3). Following, when at least two of the sheets (3) dispose in the first position (13), the innermore or rearmore sheet can include at least one light transmission portion (32) which can be at least partially obscured an outermore or frontmore sheet. Said another way, when at least two of the sheets (3) dispose in the first position (13), an outermore or front more sheet can at least partially obscure at least one light transmission portion (32) of an innermore or rearmore sheet.

Spine

Now referring primarily to FIG. 2 through FIG. 3G, and FIG. 15A, the illuminatable assembly (1) can further include a spine (56), whereby the instant spine (56) can be akin to the spine of a conventional book as would be known to one of ordinary skill in the art. Typically, the pages of a book are anchored proximate the spine.

As to particular embodiments, the support (15) can be coupled to the spine (56) such that the support (15) can be configured to dispose the light-emitting panel (4) in non-perpendicular relation to a longitudinal axis (57) of the spine (56). In particular, the support (15) can be configured to dispose the light-emitting panel front surface (9) in non-perpendicular relation to the longitudinal axis (57) of the spine (56).

As to particular embodiments, the support (15) can be coupled to the spine (56) such that the support (15) can be configured to dispose the light-emitting panel (4) (i) in substantially parallel relation or (ii) in parallel relation to the longitudinal axis (57) of the spine (56). In particular, the support (15) can be configured to dispose the light-emitting panel front surface (9) (i) in substantially parallel relation or (ii) in parallel relation to the longitudinal axis (57) of the spine (56).

It is herein noted that the disposition of the light-emitting panel (4) (i) in non-perpendicular relation to the longitudinal axis (57) of the spine (56) or (ii) in substantially parallel relation or parallel relation to the longitudinal axis (57) of the spine (56) can differentiate the instant illuminatable assembly (1) from the media-enhanced pop-up book disclosed in U.S. patent application Ser. No. 14/591,796, which teaches that the display of a computing device may be positioned behind a book such that it is substantially perpendicular to the book when the book is lying flat, such as on a table, which necessarily means that the display of the computing device is positioned in perpendicular relation to the longitudinal axis of the spine.

Cover

Again referring primarily to FIG. 2 through FIG. 3G, FIG. 15A, and FIG. 15B, the illuminatable assembly (1) can further include a cover (58), whereby the instant cover (58) can be akin to the cover of a conventional book as would be known to one of ordinary skill in the art. Typically, the cover (58) can include a front cover element (59) and a back cover element (60), whereby the spine (56) can dispose between the front and back cover elements (59)(60). Of course, the cover (58) can be coupled to the one or more sheets (3) of the illuminatable assembly (1) in the same fashion as or in a fashion similar to the way pages of a conventional book are coupled or bound to a cover of the book, whereby the sheet(s) (3) can dispose between the front and back cover elements (59)(60). In this way, the front cover element (59) can overlay or dispose proximate a sheet front surface (7) and the back cover element (60) can overlay or dispose proximate a sheet back surface (8).

As to particular embodiments, the support (15) can be coupled to the cover (58) such that the support (15) can be configured to dispose the light-emitting panel (4) in non-perpendicular relation to the cover (58) (and specifically, in non-perpendicular relation to a front surface (61) or a back surface (62) of the back cover element (60)). In particular, the support (15) can be configured to dispose the light-emitting panel front surface (9) in non-perpendicular relation to the cover (58) (and specifically, in non-perpendicular relation to the front surface (61) or the back surface (62) of the back cover element (60)).

As to particular embodiments, the support (15) can be coupled to the cover (58) such that the support (15) can be configured to dispose the light-emitting panel (4) (i) in substantially parallel relation or (ii) in parallel relation to the cover (58) (and specifically, (i) in substantially parallel relation or (ii) in parallel relation to the front surface (61) or the back surface (62) of the back cover element (60)). In particular, the support (15) can be configured to dispose the light-emitting panel front surface (9) (i) in substantially parallel relation or (ii) in parallel relation to the cover (58) (and specifically, (i) in substantially parallel relation or (ii) in parallel relation to the front surface (61) or the back surface (62) of the back cover element (60)).

It is herein noted that the disposition of the light-emitting panel (4) (i) in non-perpendicular relation to the cover (58), (ii) in substantially parallel relation to the cover (58), or (iii) in parallel relation to the cover (58) can differentiate the instant illuminatable assembly (1) from the media-enhanced pop-up book disclosed in U.S. patent application Ser. No. 14/591,796, which teaches that the display of a computing device may be positioned behind a book such that it is substantially perpendicular to the book when the book is lying flat, such as on a table, which necessarily means that the display of the computing device is positioned in perpendicular relation to the cover.

As to particular embodiments, the support (15) can be (i) coupled to, (ii) integrated with, or (iii) incorporated into the cover (58).

Now referring primarily to FIG. 2 through FIG. 3G, FIG. 15A, and FIG. 15B, as to particular embodiments, the support (15) can be (i) coupled to, (ii) integrated with, or (iii) incorporated into the back cover element (60). Following, the support (15) can dispose rearwardly or proximate the rear or back of the illuminatable assembly (1) and the one or more sheets (3) can dispose frontwardly or proximate the front of the illuminatable assembly (1).

As but one illustrative example, the back cover element (60) can provide the support (15), or the support (15) can be formed from the back cover element (60).

Now referring primarily to FIG. 15A and FIG. 15B, as but a second illustrative example, the back cover element (60) can be configured as a housing (63) which can house the support (15) and correspondingly, the light-emitting panel (4), within its interior space (64), whereby the interior space (64) can be defined by a bottom wall (65), one or more side walls (66) upwardly extending from the bottom wall (65), and a top wall (67) which disposes opposite the bottom wall (65). Moreover, there can be an opening (68) in the side of the housing (63) which communicates with the interior space (64), whereby the support (15) can be passed through the opening (68) for receipt within the interior space (64), for example via sliding the support (15) through the opening (68) into the interior space (64). Upon receipt, the support (15) can be releasably retained within the interior space (64), for example via a friction fit and/or a securement element.

In addition, the top wall (67) can include a window (69) disposed therein, whereby the window (69) can communicate with the interior space (64). Following, when the support (15) supporting a light-emitting panel (4) is received within the interior space (64), at least a portion of the light-emitting panel (4) can be viewable through the window (69) and thus, able to provide light (6) through the window (69).

Book

As to particular embodiments, the illuminatable assembly (1) can comprise a book or be configured as a book, whereby the book can be similar to a conventional book except for, of course, at least the addition of the support (15) configured to support the light-emitting panel (4), whereby the light-emitting panel (4) in an activated condition (5) can illuminate at least a portion of one or more pages (2) of the book via the light-emitting panel (4). Additionally, the illuminatable assembly (1) includes at least one sheet (3) having at least one light transmission portion (32) disposed therein, which can also differentiate the illuminatable assembly (1) configured as a book from a conventional book.

Media Content

As to particular embodiments, in addition to providing light (6), it is herein contemplated that the light-emitting panel (4) can also provide media content, such as visual content (whether a static image or video), associated with the illuminatable assembly (1) and/or a particular page (2)/sheet (3) of the illuminatable assembly (1). As to particular embodiments, the mobile computing device (11) which can include the light-emitting panel (4) can also provide audio content associated with the illuminatable assembly (1) and/or a particular page (2)/sheet (3) of the illuminatable assembly (1).

As to particular embodiments, the mobile computing device (11) can access data associated with the illuminatable assembly (1), for example data associated with the story, tale, narrative, lesson, or the like, described within one or more pages (2) of the illuminatable assembly (1). The data may be stored on the mobile computing device (11) or received via a network responsive to a request communicated by the mobile computing device (11) to download the data. As to particular embodiments, the data may be received from an online store or marketplace. As to other particular embodiments, the data may be received directly from the illuminatable assembly (1) via a wired or wireless connection between the mobile computing device (11) and the illuminatable assembly (1).

As to particular embodiments, a portion of the media content provided by the data can be associated with a page identifier which relates that portion of the media content with a corresponding page (2) of the illuminatable assembly (1). For example, the data can provide visual content or audio content which correlates with a particular page (2) of the illuminatable assembly (1).

As to particular embodiments, the page identifier can be detected by a controller associated with the mobile computing device (11). For example, the page identifier may be detected by the controller when the page (2) disposes in the outermost position.

Following, the controller can determine the media content associated with the detected page identifier and corresponding page (2). For example, the controller can compare the detected page identifier to the data, and select the media content from the data based on the detected page identifier.

Subsequently, the controller can communicate the selected media content associated with the detected page identifier and corresponding page (2) (i) to cause the display (12) to display the selected visual content and/or (ii) to cause the mobile computing device (11) to play the selected audio content.

As but one illustrative example, the page identifier can be configured as a near field communication (NFC) tag, which may be coupled to or embedded within the page (2), whereby each page (2) can include a different NFC tag. The mobile computing device (11) can include an NFC sensor capable of detecting the NFC tag when in close proximity, such as when the page (2) disposes in the outermost position. Of course, it is herein contemplated that other types of wireless or unpowered tags may be used in place of NFC tags to provide page identifiers.

As to other particular embodiments, the illuminatable assembly (1) may include a page sensor that senses a page (2) position, and communicates sensor data (e.g., via a wired or wireless connection) to the mobile computing device (11). For example, the page sensor may be configured as a flex sensor, which changes in resistance or voltage when flexed or bent, whereby the flex sensor may output a high resistance value with a greater amount of bend, and a low resistance value with a lesser amount of bend. Accordingly, the flex sensor can be attached around the hinge of the illuminatable assembly (1) to sense page (2) position, whereby the resistance values of the flex sensor may be mapped to each page (2) to enable the mobile computing device (11) to determine the outermost page (2) based on the resistance value of the flex sensor.

Production

Now regarding production, a method of making a particular embodiment of the illuminatable assembly (1) can include movably coupling a plurality of sheets (3) to a support (15), whereby the support (15) can be configured to support a light-emitting panel (4) provided by a mobile computing device (11). Each sheet (3) can include a light transmission portion (32) communicating between sheet front and back surfaces (7)(8). When the sheets (3) dispose in a first position (13), the light transmission portions (32) can overlaying engage to provide aligned light transmission portions (32).

A method of making another particular embodiment of the illuminatable assembly (1) can include movably coupling at least one sheet (3) to a support (15), whereby the support (15) can be configured to support a light-emitting panel (4) provided by a mobile computing device (11). The sheet (3) can include a light transmission portion (32) communicating between sheet front and back surfaces (7)(8). The method can further include disposing a layer (38) between the support (15) and the sheet (3), whereby the layer (38) can include at least one illuminatable indicium (37) which can be viewable via the light transmission portion (32).

A method of making another particular embodiment of the illuminatable assembly (1) can include coupling a support (15) to a spine (56), whereby the support (15) can be configured to support a light-emitting panel (4) provided by a mobile computing device (11). The method can further include movably coupling at least one sheet (3) to the support (15), whereby the sheet (3) can include a light transmission portion (32) communicating between sheet front and back surfaces (7)(8). Further, the support (15) can be configured to dispose the light-emitting panel (4) in substantially parallel relation to a longitudinal axis (57) of the spine (56).

The method of making particular embodiments of the illuminatable assembly (1) can further include providing additional components of the illuminatable assembly (1) as described above.

As can be easily understood from the foregoing, the basic concepts of the present invention may be embodied in a variety of ways. The invention involves numerous and varied embodiments of an illuminatable assembly and methods for making and using such an illuminatable assembly.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or a method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "coupler" should be understood to encompass disclosure of the act of "coupling"—whether explicitly discussed or not—and, conversely, were there effectively disclosure of the act of "coupling", such a disclosure should be understood to encompass disclosure of a "coupler" and even a "means for coupling." Such alternative terms for each element or step are to be understood to be explicitly included in the description.

In addition, as to each term used, it should be understood that unless its utilization in this application is inconsistent with such interpretation, common dictionary definitions should be understood to be included in the description for each term as contained in Merriam-Webster's Dictionary, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about", it will be understood that the particular value forms another embodiment. The term "about" generally refers to a range of numeric values that one of skill in the art would consider equivalent to the recited numeric value or having the same function or result.

Similarly, the antecedent "substantially" or "generally" means largely, but not wholly, the same form, manner or degree and the particular element following "substantially" will have a range of configurations as a person of ordinary skill in the art would consider to be sufficient to have the same function or result. When a particular element is expressed as an approximation by use of the antecedent "substantially" or "generally", it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Further, for the purposes of the present invention, the term "coupled" or derivatives thereof can mean indirectly coupled, coupled, directly coupled, connected, directly connected, or integrated with, depending upon the embodiment.

Thus, the applicant should be understood to claim at least: (i) each embodiment of the illuminatable assembly herein disclosed and described, (ii) the related methods disclosed and described, (iii) similar, equivalent, and even implicit variations of each of these apparatuses and methods, (iv) those alternative embodiments which accomplish each of the functions shown, disclosed, or described, (v) those alternative designs and methods which accomplish each of the functions shown as are implicit to accomplish that which is disclosed and described, (vi) each feature, component, and step shown as separate and independent inventions, (vii) the applications enhanced by the various systems or components disclosed, (viii) the resulting products produced by such systems or components, (ix) methods and apparatuses substantially as described hereinbefore and with reference to any of the accompanying examples, and (x) the various combinations and permutations of each of the previous elements disclosed.

The background section of this patent application, if any, provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification are further intended to describe the metes and bounds of a limited number of embodiments of the invention and are not to be construed as the broadest embodiment of the invention or a complete listing of embodiments of the invention that may be claimed. The applicant does not waive any right to develop further claims based upon the description set forth above or in the drawings as a part of any continuation, division, continuation-in-part, or similar application.

The invention claimed is:

1. An illuminatable assembly comprising:
   a support configured to support a light-emitting panel provided by a mobile computing device; and
   a plurality of sheets movably coupled to said support;
   wherein each said sheet comprises a light transmission portion communicating between sheet front and back surfaces; and
   wherein when said sheets dispose in a first position, said light transmission portions dispose in overlaying engagement to provide aligned light transmission portions.

2. The illuminatable assembly of claim 1, wherein said aligned light transmission portions provide a light transmission pathway from said light-emitting panel.

3. The illuminatable assembly of claim 1, wherein light provided by said light-emitting panel travels along said light transmission pathway through said aligned light transmission portions to illuminate at least a portion of said sheet front surface of said sheet which disposes farthest from said light-emitting panel.

4. The illuminatable assembly of claim 1, wherein said mobile computing device comprises a mobile phone.

5. The illuminatable assembly of claim 1, wherein said mobile computing device comprises a tablet computer.

6. The illuminatable assembly of claim 1, wherein said support is configured to releasably engage with variably-sized light-emitting panels.

7. The illuminatable assembly of claim 1, further comprising a cover coupled to said support;
wherein said support is incorporated into said cover.

8. An illuminatable assembly comprising:
a support configured to support a light-emitting panel provided by a mobile computing device;
at least one sheet movably coupled to said support;
a light transmission portion disposed within said sheet to communicate between sheet front and back surfaces; and
a layer disposed between said support and said sheet, said layer comprising at least one illuminatable indicium;
wherein said illuminatable indicium is viewable via said light transmission portion.

9. The illuminatable assembly of claim 8, wherein said layer comprises a translucent material.

10. The illuminatable assembly of claim 8, wherein said mobile computing device comprises a mobile phone.

11. The illuminatable assembly of claim 8, wherein said mobile computing device comprises a tablet computer.

12. The illuminatable assembly of claim 8, wherein said support is configured to releasably engage with variably-sized light-emitting panels.

13. The illuminatable assembly of claim 8, further comprising a cover coupled to said support;
wherein said support is incorporated into said cover.

14. An illuminatable assembly comprising:
a spine;
a support coupled to said spine, said support configured to support a light-emitting panel provided by a mobile computing device;
at least one sheet movably coupled to said support; and
a light transmission portion disposed within said sheet to communicate between sheet front and back surfaces of said sheet;
wherein said support is configured to dispose said light-emitting panel in substantially parallel relation to a longitudinal axis of said spine.

15. The illuminatable assembly of claim 14, wherein said support comprises a cavity configured to receive said light-emitting panel.

16. The illuminatable assembly of claim 15, wherein said support comprises a resilient element coupled to said cavity.

17. The illuminatable assembly of claim 14, wherein said support is configured to releasably engage with variably-sized light-emitting panels.

18. The illuminatable assembly of claim 14, wherein said mobile computing device comprises a mobile phone.

19. The illuminatable assembly of claim 14, wherein said mobile computing device comprises a tablet computer.

20. The illuminatable assembly of claim 14, further comprising a cover coupled to said support;
wherein said support is incorporated into said cover.

* * * * *